(12) United States Patent
Bureau et al.

(10) Patent No.: US 12,427,951 B2
(45) Date of Patent: Sep. 30, 2025

(54) VEHICLE WASH SYSTEM

(71) Applicant: AutoMap Vehicle Wash Systems, Inc., Blaine, MN (US)

(72) Inventors: Howard Victor Bureau, Blaine, MN (US); Tom Takemoto Bureau, Blaine, MN (US); Sam Takemoto Bureau, Blaine, MN (US)

(73) Assignee: AUTOMAP VEHICLE WASH SYSTEMS, INC., Blaine, MN (US)

( * ) Notice: Subject to any disclaimer, the term of this patent is extended or adjusted under 35 U.S.C. 154(b) by 148 days.

(21) Appl. No.: 18/505,964

(22) Filed: Nov. 9, 2023

(65) Prior Publication Data
US 2024/0149838 A1 May 9, 2024

Related U.S. Application Data

(60) Provisional application No. 63/383,029, filed on Nov. 9, 2022.

(51) Int. Cl.
*B60S 3/04* (2006.01)
(52) U.S. Cl.
CPC ........................................ *B60S 3/04* (2013.01)
(58) Field of Classification Search
CPC ........................................................ B60S 3/04
See application file for complete search history.

(56) References Cited

U.S. PATENT DOCUMENTS

| | | | |
|---|---|---|---|
| 3,795,929 | A | 3/1974 | Thompson |
| 6,769,440 | B2 | 8/2004 | Jones et al. |
| 7,380,558 | B2 | 6/2008 | Krause et al. |
| 7,438,075 | B1 | 10/2008 | Huntington et al. |
| 8,550,098 | B2 | 10/2013 | Belanger |
| 10,286,410 | B2 | 5/2019 | Petit |
| 10,532,721 | B2 | 1/2020 | Jensen |
| 10,682,989 | B2 | 6/2020 | Blackstock |
| 11,155,245 | B2 | 10/2021 | Detrick |
| 2022/0005557 | A1 | 1/2022 | Yin et al. |

FOREIGN PATENT DOCUMENTS

KR 20220019618 2/2022

*Primary Examiner* — Jason Y Ko
(74) *Attorney, Agent, or Firm* — Winthrop & Weinstine, P.A.

(57) ABSTRACT

An open top wash system having separate wash mechanisms on opposite sides of a wash zone provides considerable flexibility and efficiency by allowing vehicles of several heights to be washed. The wash mechanisms are further configured to provide additional efficiency by allowing wash and/or rinse nozzles to be positioned in close proximity to the vehicle, thereby limiting amount of water need for washing operations. The wash system also has several sensors positioned and controlled to trace a vehicle in the wash zone, thus providing significant information for use in positioning both side wash spray nozzles and tracer wand spray nozzles during wash and rinse operations. Although the control system is capable of careful control of nozzles, mechanical breakaway systems are further included should physical contact with the vehicle occur, thus allowing an additional level of safety.

16 Claims, 18 Drawing Sheets

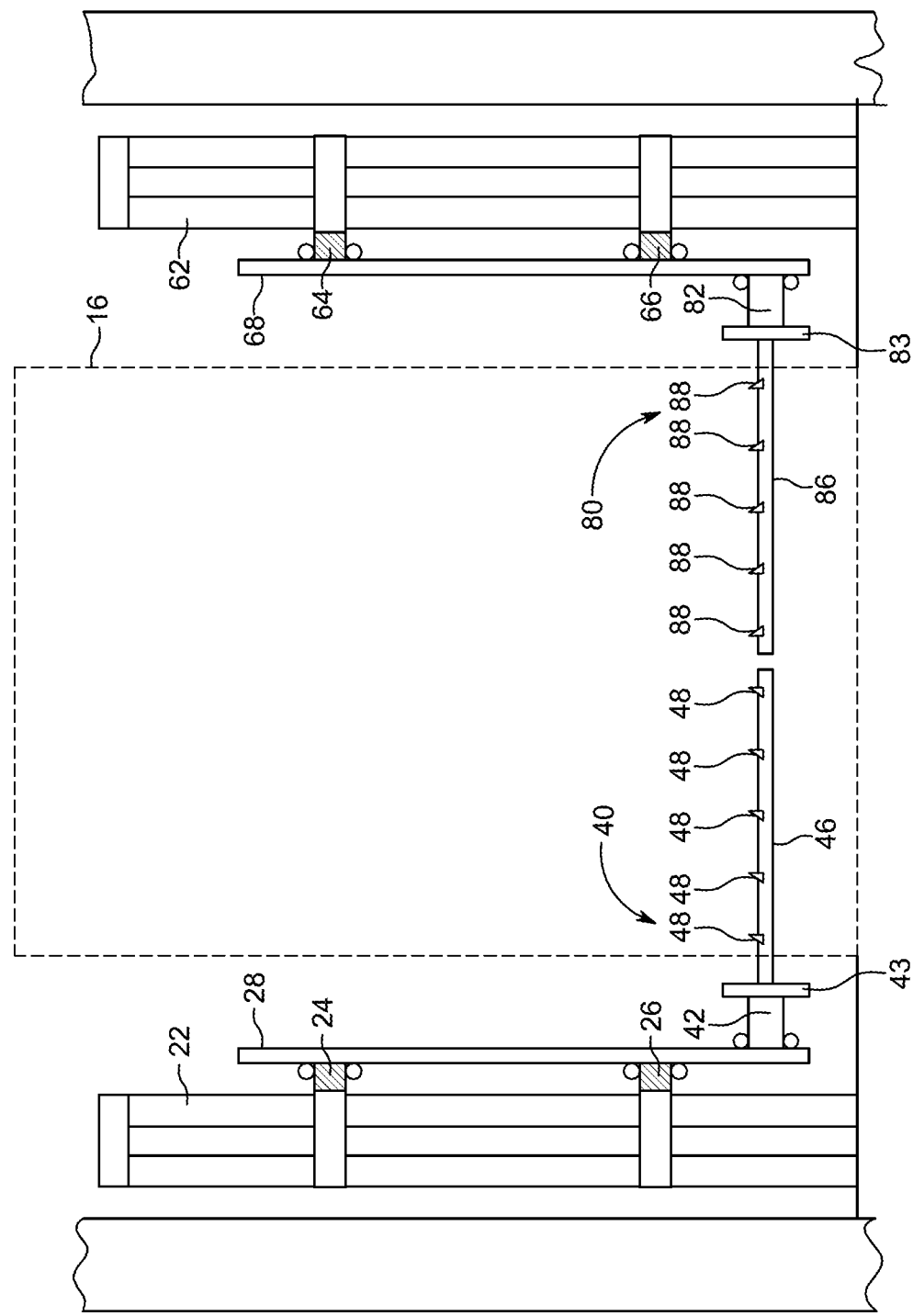

VEHICLE WASH SYSTEM

BACKGROUND

In the car or vehicle wash industry, many different wash systems are utilized to clean surfaces of vehicles. Wash systems generally fall into two categories—touchless or soft touch (also referred to as friction wash systems). Soft touch systems require brushes or rag-like materials to contact the vehicle and brush away sediment or dirt that has accumulated on various surfaces. Using a slightly different methodology, touch-free systems utilize spray nozzles that project chemicals, soaps and/or water to the vehicle surface in an effort to remove dirt and other substances that have accumulated thereon. Generally speaking, each of these systems involve the movement of wash nozzles or washing material (i.e., brushes, squeegee rags, cloths, etc.) along the surfaces of a vehicle and the coordinated application of soaps, chemicals, and/or washing water.

In automated touch-free wash operations, systems and machinery is carefully designed so that physical contact with the vehicle is avoided. A primary concern for wash system operators is the protection of both the customer's vehicle and the wash equipment. Thus, several steps are taken to avoid any contact that could create dents, scratches or damage to the surface of the vehicle being washed. As will be appreciated, additional complications are created when dealing with side mirrors, luggage racks, bike racks, trailer hitches, bumpers, etc. Based upon these concerns, existing wash system are carefully designed and operated to maintain significant separation and distance between operating components of the wash system, and the vehicle itself.

Existing touch-free wash systems will typically use either floor mounted guide rails (railroad track-type) or overhead suspended guide rails (about 8 feet off the ground) to support and move a gantry system that houses several of the operating components. At least two driven wheels on each side of the machine drive the gantry forward and backwards along the rails to achieve necessary movement. With the floor supported systems, spray nozzles are housed in the upright sides of the gantry system and overhead nozzles housed within the upper portion. By moving the gantry along the tracks, the nozzles can be positioned at appropriate locations on the sides and top of the vehicle to provide spray to all surfaces. With overhead systems, a spray wand extends downwardly and contains a number of nozzles. In this system, the wand is suspended from a rotary support, and is moved along with the overhead gantry so that nozzles can be directed to all surfaces of the vehicle being washed. The spray arm in these systems, typically and upside down 'L", moves around the vehicle while rotating to round each corner. Other systems will utilize oscillating or rotating, zero or low degree nozzles to increase water pressure due to the extended distance from the vehicle to increase washing efficiency.

With both the floor supported systems and overhead supported systems, a drive motor, high pressure pump(s), hoses, and other components are typically positioned inside the gantry which makes these mechanisms very heavy. Naturally, this requires significant structure to support these systems thus making the gantry system somewhat large. In addition, the gantry also creates fixed height limit for the wash system and an upper limit for the height of vehicles that can be washed.

Another drawback of existing wash systems is how they deal with vehicles that are misaligned. During natural operations, if a vehicle is parked at an angle, or too far to one side or the other, poor cleaning quality, dirt films and/or dirt (zebra) strips can result. To compensate for this, existing systems are often configured to use a narrow spray pattern (zero degree or low degree) rotating or oscillating devices to increase pressure over the longer distances (i.e., when further from the surface of the vehicle). These spinning, zero-degree nozzles will create high powered water impact on the vehicle surface but causes two problems: (i) if the vehicle is too close, damage to the vehicle is possible, and (ii) the oscillating and rotating nozzles need to overlap spray patterns in order to efficiently clean. Additionally, cleaning issues must be accounted for—if the nozzle is too close, zebra strips may appear, while a nozzle too far away will cause the spray will start to mist, causing improper cleaning and the creation of dirt films. Lastly, these systems can use a lot of water due to the increased water pressure required.

Several existing touchless wash systems attempt to incorporate sensors to detect elements of the vehicle and to avoid contact with mirrors or other irregular structures typically found on a vehicle. Based upon existing sensor technology, however, these sensors and systems are specifically designed to have a very wide clearance and tolerance to make sure that no contact will occur. While it is certainly beneficial to avoid physical contact, these wide tolerances cause all nozzles or washing components to be positioned/situated a long distance from the surface of the vehicle. As nozzles are attempting to spray a more concentrated stream, distance from the surface of the vehicle is critical. As water exits the tip of a nozzle, the spray pattern will tend to mist and disburse as it moves further away from the nozzle tip, thus eliminating or canceling any spray force produced by the stream of water. As such, it is clearly desirable to position washing nozzles an optimum distance from the vehicle surface, preferably 4-12 inches of the vehicle (or closer). Prior art systems simply have challenges which do not allow this optimum placement while also avoiding potential damage to the vehicle.

In some cases, these existing systems use sensors on a tracer arm to attempt to locate the vehicle and to avoid contact. In an abundance of caution, and based upon limitations of the sensors, these systems do not allow the spray nozzles to get very close. The sensors are typically not capable of sensing fine distinctions, and thus it is necessary for the nozzles to stay a significant distance away from the vehicle (1~2 feet). In these systems, when the eyes are clear, a washing wand or mechanism will get closer to the vehicle and reverse if a sensor becomes blocked by the vehicle. This extra distance can cause the machine to use even more water. In many cases, it becomes so difficult to properly clean touch free that operators resort to using ever stronger chemicals. These stronger acids and alkaline do aid in cleaning, but can be very hard on the vehicle, wash equipment, the wash bay and the environment. Due to the strength of these chemicals, extra wash passes may be required to properly wash the chemicals off the vehicle thus again utilizing more water. Furthermore, stronger chemicals can be extremely corrosive or poisonous. Operators must be very careful balancing chemical strength and ensuring employee safety when handling these chemicals.

Based upon these limitations, there is a need for an improved touch-free wash system which is efficient, flexible, and capable of quality cleaning operations.

SUMMARY

In an effort to provide an improved touch-free automated wash system, the gantry of the prior art is essentially eliminated, and a more flexible split bay system is utilized. In this split bay/open top system, a wash mechanism will comprise independent driver-side and passenger left-side wash mechanisms which cooperate with one another but do not have a physical connection to one another. The driver-side and passenger-side wash mechanisms are each independently supported by a rail mechanism which allows for movement along the entire length of the wash bay. The driver-side and passenger-side wash mechanisms each further include rail cart (also referred to as a carriage assembly or an exoskeleton) supported by and movable along the support rails. A tray system is coupled to the rail cart, thus allowing for movement along the length of the wash bay. Driver side and passenger side tracer arms are also carried by the respective rail carts, with the tracer arms extending inwardly toward a wash zone. Both the vertical tracer and the horizontal pusher mechanisms feature an independent, hard-strike breakaway capability that is needed to avoid any possibility of damage to a vehicle being washed and/or the wash equipment itself. For example, if the customer opens the door while the machine is operating, or a side view mirror automatically moves outward during the wash, the pusher and tracer can both break away as needed, and a safety sensor will trigger the machine to stop automatically. In addition, if the customer drives forward during the wash, the tracer arm can break away 90 degrees allowing the vehicle to exit the bay without being damaged; this tracer also tilts up at the same time. Sensors will detect the break, generate a fault, and stop the machine.

Carried on each of the trays is a pusher mechanism and a spray manifold, which is designed to carry an array of spray nozzles. The pusher mechanism is further configured to move the tray in and out (i.e., toward and away from a vehicle being washed) independently on both the driver side and passenger side. The array of spray nozzles carried by the manifold mechanism are generally aligned in a vertical array and are configured to spray horizontally, thus washing the sides of the vehicle. The pusher mechanism, along with a number of sensors and/or a light curtain system, allows these side nozzles to be positioned adjacent to the side surfaces of the vehicle at an optimal distance to achieve desired wash functions, all while avoiding protrusions from the vehicle like mirrors, luggage racks, bike racks, trailer hitches, bumpers, etc. More specifically, these nozzles are capable of being placed very close to the surface, thus ensuring the efficiency of the spray nozzles themselves and any chemicals that are being applied.

As mentioned, the driver-side and passenger-side wash mechanisms also include a tracer manifold or wand carried by the transport device, and extending inwardly toward a wash zone where the vehicle will be situated. Generally speaking, this tracer manifold maintains a horizontal array of wand spray nozzles which are positioned along the tracer manifold at different locations within the wash zone. This horizontal array of nozzles can be moved and positioned appropriately to wash the front of a vehicle, the hood, windshield, roof, etc. as controlled by a related control system. To achieve this, the tracer manifolds can be moved vertically by a tracer drive mechanism, which will operate in conjunction with the mechanical transport device to allow positioning at any location within the wash zone. Again, sensors and/or light curtains allow for precise control of the tracer manifold, allowing it to be moved to optimum positions that allow nozzles to be very close to the surfaces of the vehicle itself (typically inches away). Furthermore, while traditional spray nozzles are in a fixed position, the vertical tracer arm has an attached rotating motor which can rotate over 270 degrees, whereby when at the front of the vehicle, the nozzles are pointed directly at the grill, when over the hood, they are pointed down, and when at the rear of the vehicle, they are pointed directly at the back of the vehicle. With this design, many random rotation points can be used, depending on the shape of the vehicle, so that efficient chemical and water pressure is used to spray directly at the vehicle at all times, thus providing for maximum pressure and cleaning effectiveness. Further, because of the open top design (no gantry overhead) there is no theoretical limit to the height the tracer can travel upward. Thus, the smallest mini car and a semi-tractor trailer can be washed in the same bay while always maintaining the same distance from the vehicle both horizontally and vertically.

As is mentioned above, various control systems are utilized to provide proper placement and alignment of spray nozzles throughout the wash system. One source of information for use by these control systems is a light curtain and cooperating sensors that "scan" the vehicle as it enters to the wash bay. Using this light curtain, detailed information about the height of the vehicle, and its profile can be obtained and stored. Additionally, sensors carried by the wash system may be able to continually scan the vehicle while it is being washed. This information will allow the control systems to position nozzles in close proximity to the various vehicle surfaces. Such placement is not possible without this detailed information made available to the necessary controllers.

As mentioned above, a tray mechanism is utilized to deal with possible hard strikes. More specifically, a rotatably mounted tray mechanism supports a pusher and side spray manifold, thus creating a breakaway mechanism which provides additional safety. The tracer manifold is also supported by a breakaway mechanism thus allowing it to deflect if contact occurs. Using these structures, all wash mechanisms have a snapback and reset capability, allowing them to break away during the hard strikes that may occur, and then resetting themselves once appropriately cleared from vehicle structures. Some previous systems are hard to recover from a hard strike and may utilize sheer bolts or other such devices and/or mechanical intervention to recover and repair after a hard strike. This is not ideal, especially when there is a line of vehicles waiting to be washed, or it is a weekend and only inexperienced staff are available. The rail cart and related mechanisms outlined above are designed to auto reset or simply be pushed back by hand, thus providing an additional level of efficiency.

To provide additional features and functionality, the nozzle system utilized in the touch-free wash mechanism may include multiple nozzles to carry a combination of chemicals, wash water, and any other substances that may be sprayed on the vehicle during wash operations. By including separate nozzles, and separate fluid handling mechanisms, the wash process can be tailored and/or modified as needed to meet the specific needs of washing operations and results in a very short reload time for chemical switchover, saving valuable time.

The design outlined above is particularly effective when incorporated into a touch free design. That said, a soft-touch system could take advantage of several features outlined above, making use of a rotating friction element (soft-touch) positioned on the pushers and/or tracer wands system. A flex wash option, touch-free or friction could also be incorporated, allowing users with the option to select either type of wash in the same system.

As mentioned above, a light curtain and/or a set of sensors can be utilized to provide vehicle data to wash system control systems as necessary. In order to maintain the efficiency of this light curtain system and/or sensors, a self-washing mechanism can be included. More specifically, a mechanism can be included in the automated wash system to provide self-cleaning of light curtain sensors, and any other necessary sensors between wash cycles. These self-cleaning mechanisms will ensure the accuracy and efficiency of these sensors and will also allow for the more efficient operation and washing of vehicles.

In addition to the fluid handling mechanisms, the automated wash system may include onboard dryers. More specifically, the pusher manifold and tracer manifold may both include air handling tubes and systems, thus allowing drying air directed towards the vehicle during a drying operation, very similar to the way fluid is directed to the vehicle during washing operations. In this way drying air can be directed towards the vehicle from a short distance away, and in a very controlled and efficient manner. As such, air handling mechanisms and dryers necessary to carry out drying operations do not need to have the large capacity typically found in today's wash systems.

Lastly, each of the independent wash systems mechanisms on both sides of a wash bay are carefully designed and configured to maintain and handle the weight of components. It should also be noted that this avoids the existence of any machinery or equipment above the wash zone and provides the ability to wash vehicles of different heights. Further, all components are optimized to be efficient and extremely effective. For example, a counter-balance system can be used to more effectively handle the weight of the tracer motor. Such an approach also aids in reducing 'belt bouncing' as the tracer motor moves up and down rapidly to clear obstacles.

BRIEF DESCRIPTION OF THE DRAWINGS

The advantages and features of the disclosed embodiments are further described in the following description, in conjunction with the drawings, in which:

FIGS. 2A, 2B and 2C are various front views of the wash system;

DESCRIPTION

In the embodiments described below, an extremely efficient and effective touchless wash system is described. Further, it will be described how several features of the touchless wash system could also be incorporated into a soft-touch wash system. As will be apparent, the cooperation of various components interacting with one another provides a system which exhibits efficiencies and features not available in previously provided wash systems. Again, the present embodiment is a touchless or touch-free wash system, meaning that the washing elements or components do not physical contact the vehicle. Stated differently, all cleaning and washing operations are carried out through pressurized water streams that are appropriately positioned and operated to remove dirt, residue and other materials that have settled on the surface of the vehicle itself. As will be further discussed below, the embodiments disclosed allow for the washing of many different vehicle types, and do not have theoretical upper height, length or width limitations commonly found in existing wash systems. As will be shown, a compact car could be washed in the wash bay and the next vehicle could be a 26-foot-long dock truck that is 8' tall. For each wash, the spray nozzles will all be inches away from the vehicle, ensuring a consistent wash experience.

Figure 1A:
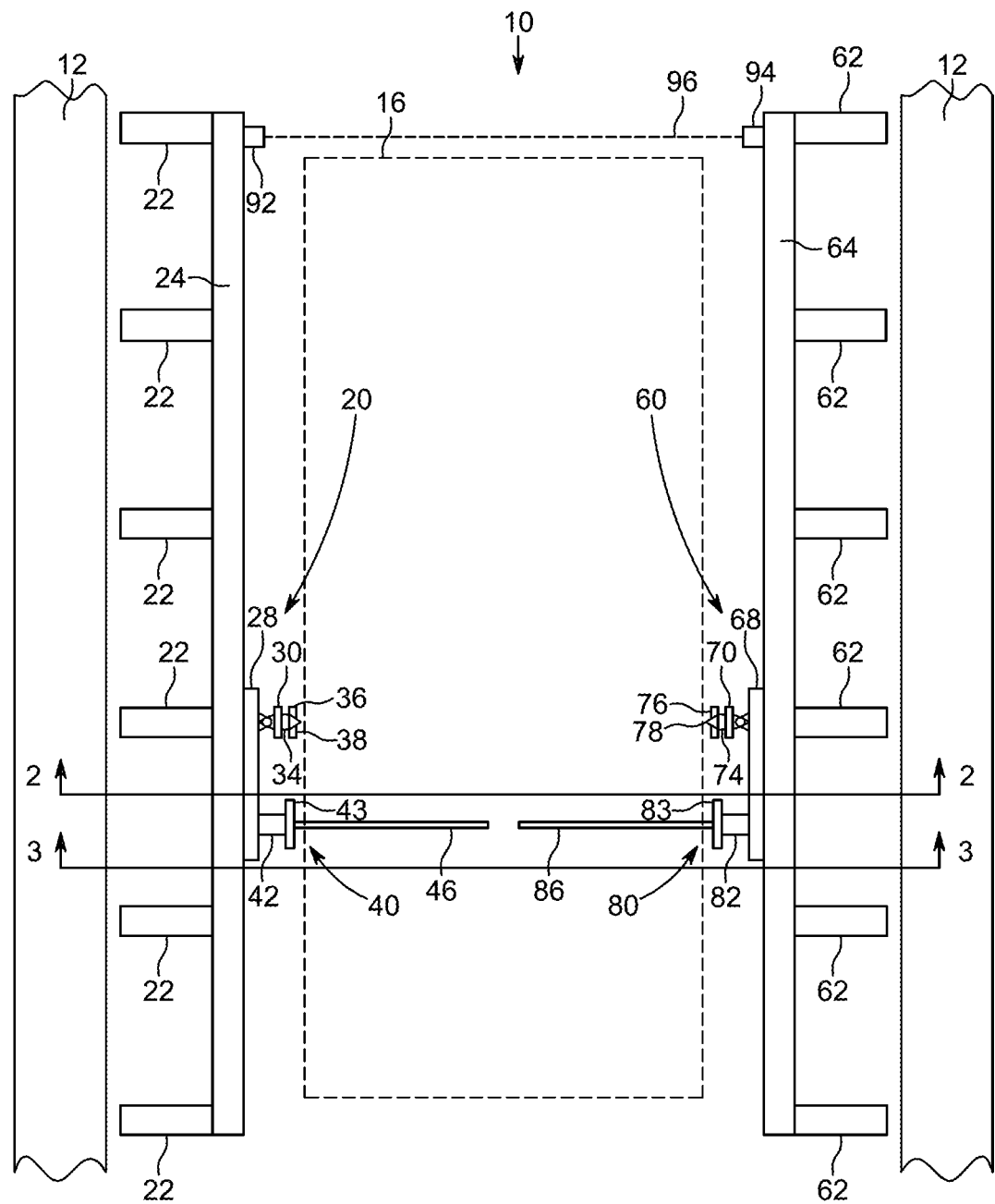
FIGS. 1A and 1B are top schematic and device views, respectively, of one embodiment of the wash system.
Figure 1B:
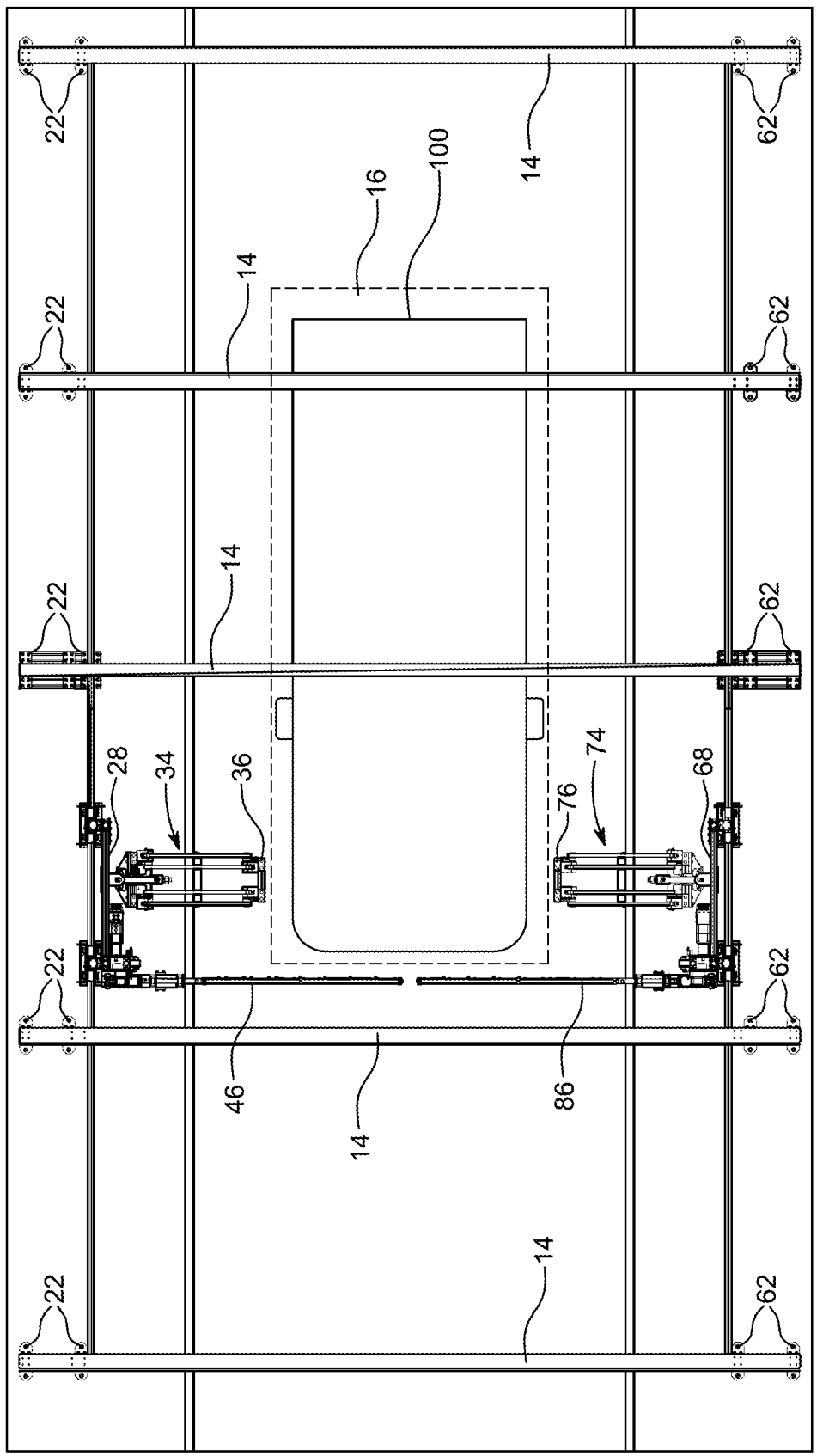
Figure 2A:
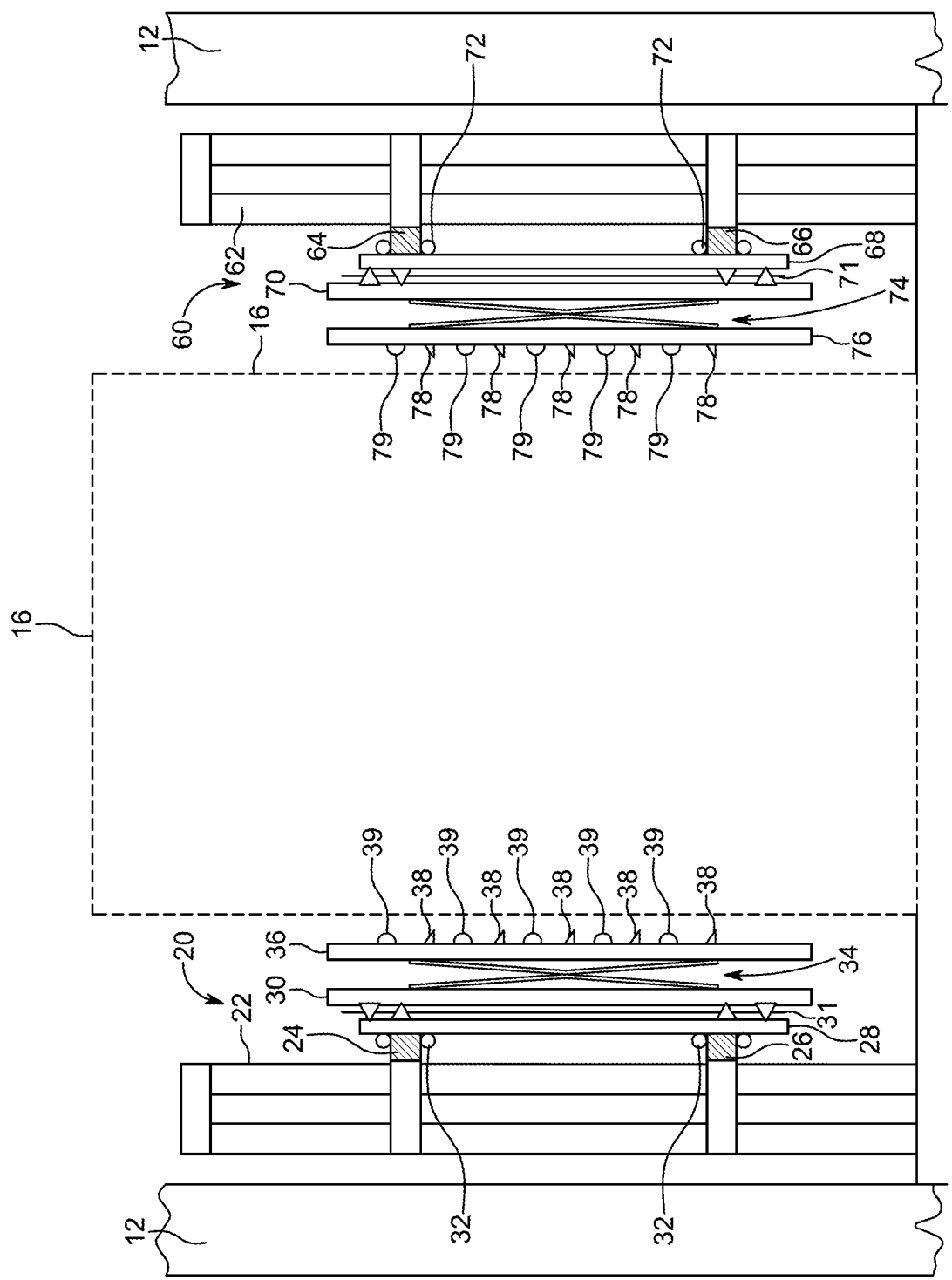
Figure 2C:
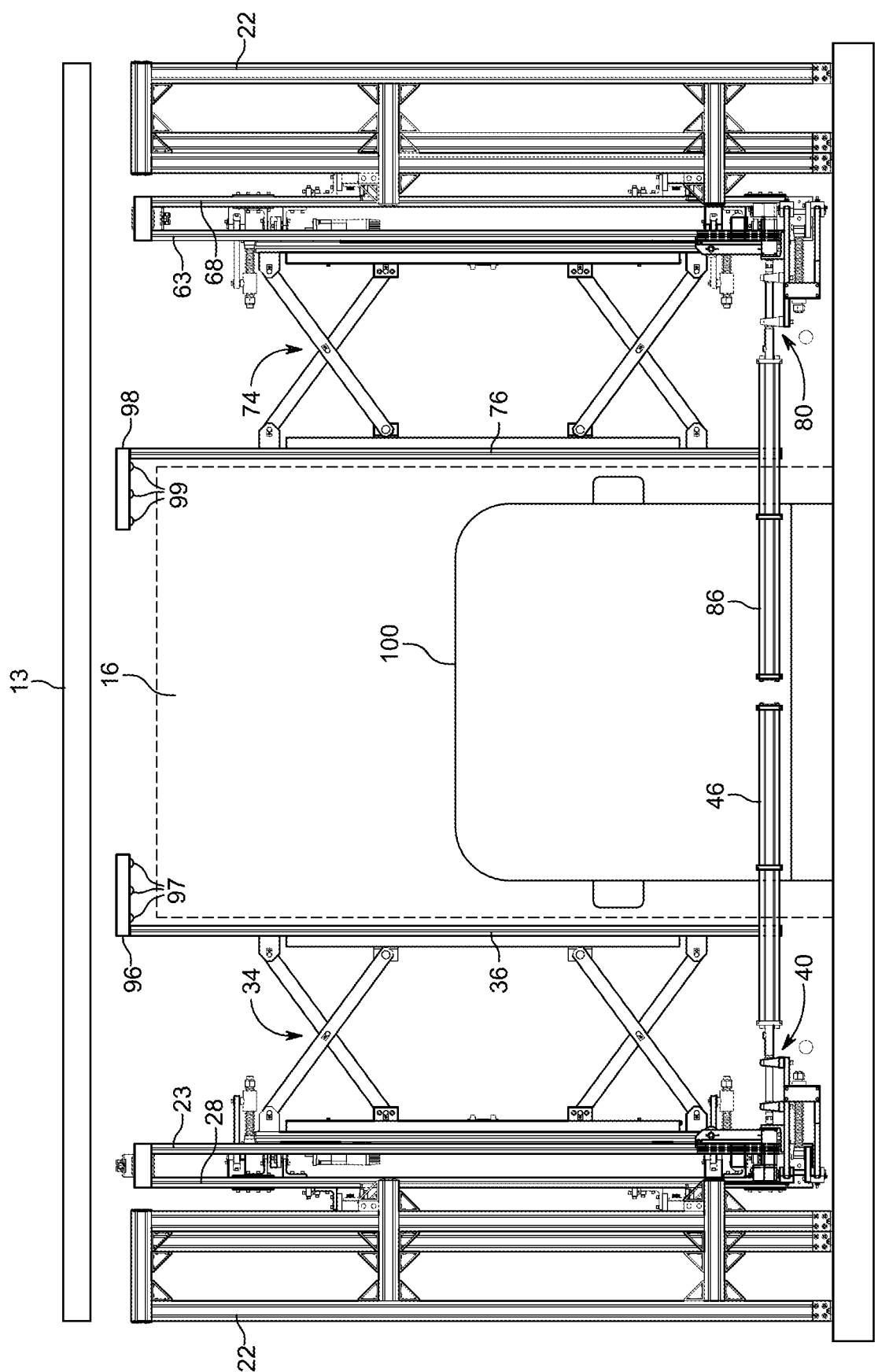
Figure 3:
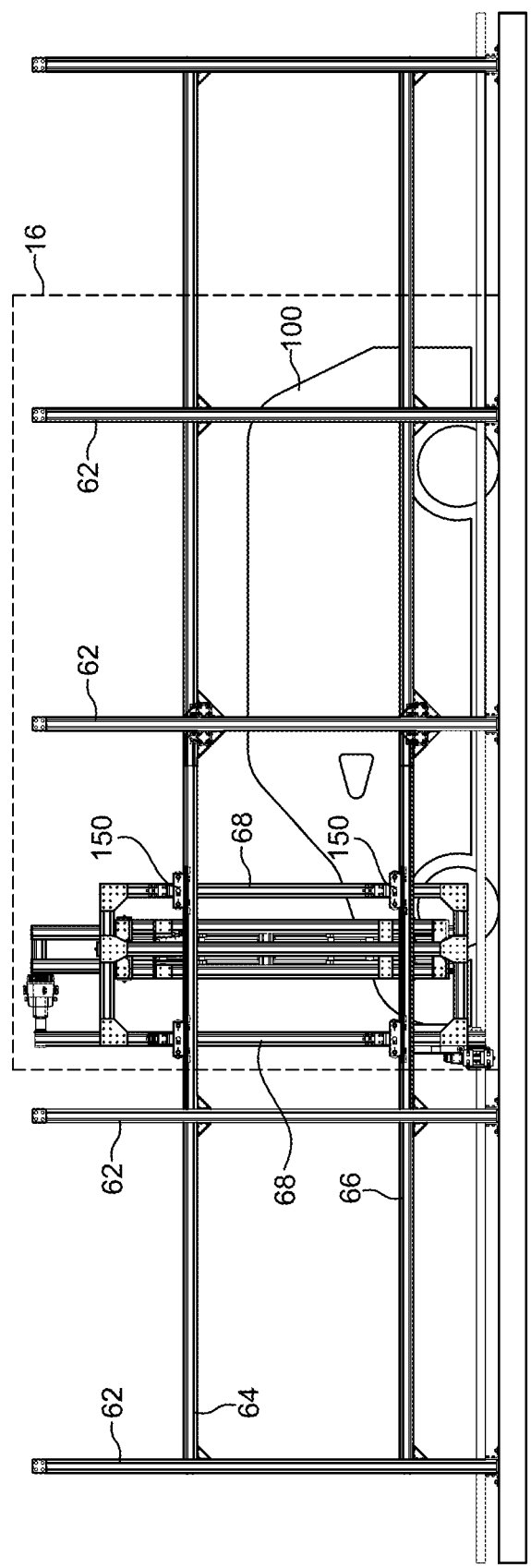
FIG. 3 is a side view of the wash system.

Turning now to FIGS. 1 through 3, various views and schematic representations of certain embodiments of a wash system 10 are presented. As will be appreciated, wash system 10 includes several components uniquely configured and assembled to carry out the various features and functions necessary to efficiently and effectively clean vehicles. In the disclosed embodiments, it is contemplated that wash system 10 is positioned within a building or structure of some type, which typically will have external walls 12 on the outer sides of wash system 10. In these schematic illustrations, it is contemplated that vehicles to be washed will enter a wash zone 16 which is centrally located between walls 12. It is contemplated that vehicles will enter wash zone 16 by driving through various doors or entryways (not shown) into wash system 10. The layout of wash system that allows for vehicle entry is best seen in FIGS. 1A and 1B which are top views of wash system 10.

To illustrate certain components, FIGS. 2A, 2B and 2C are partial front views of wash system 10. More specifically, FIG. 2A is a front schematic view as presented along view lines 2-2 shown in FIG. 1. Similarly, FIG. 2B is a similar partial front schematic view generally presented along view lines 3-3 shown in FIG. 1A (for ease of viewing, certain elements have been removed from FIG. 2B, which will be further discussed below). Further, FIG. 2C is a door view of wash system 10 with various components shown in additional detail. As mentioned above, wash system 10 utilizes a split bay design where washing mechanisms are supported on both a first side and a second side of wash zone 16. With this approach, no overhead mechanism defines or constrains an upper end of wash zone 16. (Although FIG. 2C does present one embodiment where a roof 13 is illustrated positioned above wash zone 16, it will be recognized that, in this embodiment, no operating equipment is placed in this area.) Using this approach, vehicles of various heights can easily be accommodated and washed within wash system 10, and there is theoretically no height, length or width limitation. As shown in FIGS. 1 through 3, this split bay approach is achieved by having a first side wash mechanism 20 and a second side wash mechanism 60 which are separate and independent from one another. As will be seen, these wash mechanisms are mirror images of one another, although they have the ability to operate independently. That said, the coordinated operation of these will provide levels of efficiency.

First wash mechanism 20 includes many different components, all of which are supported by a plurality of uprights 22 which are fastened to a floor of the building or structure which houses wash system 10. These uprights typically form a steel framework, or other similar structural members. It is well recognized that these supports could take many different forms including I-beam members (welded or bolted together), box beams, or other known fabrication materials. In the illustrated embodiment shown in FIGS. 2A-2C, a pair of upright beams and related cross members are used form uprights 22. It is further contemplated that uprights 22 could also be supported or anchored to walls 12 in order to provide further support, or to better accommodate the building involved. As mentioned above, it is also possible that uprights 22 could be coupled to similar uprights 62 of second wash mechanism 60 using cross members 14. (See FIG. 1B). This could be necessary or appropriate when a free-standing or outdoor wash is necessary.

As discussed in further detail below, uprights 22 support a first side upper side rail 24 and a first side lower side rail 26 which are used to further support various movable numbers. Depending on the details of the structure housing wash system 10, the first side upper side rail 24 and the first side lower side rail 26 could be supported by the walls 12, and uprights 22 could be eliminated. Movably coupled to first side upper side rail 24 and first side lower side rail 26 is an exoskeleton system 28 (also referred to as a rail cart or a carriage assembly) which is used to support several other components and systems. A first side tray 30 is rotatably and extendably coupled to exoskeleton 28 via a breakaway system (discussed in further detail below) so as to support a plurality of side spray nozzles 38. As shown in FIG. 2A, tray 30 is coupled to exoskeleton 28 in a manner to be rotatable about an axis 31 which is generally vertical.

Further referring to FIGS. 1A, 2A and 2C, a pusher mechanism 34 is used to couple tray 30 to a pusher manifold 36. As will be recognized, pusher manifold 36 is movable toward and away from tray 30 using pusher mechanism 34. Pusher manifold 36 also supports a plurality of nozzles 38 which are used for various purposes in washing operations. Although many variations are possible, pusher manifold nozzles 38 (or side spray nozzles 38) could include water spray nozzles, spinning nozzles, soap nozzles and several other possible components. Further, as best shown in FIG. 2A, a first side drive motor or drive system 32 is utilized to cause movement of exoskeleton 28 and all related components along first side upper rail 24 and first side lower rail 26. First side drive system 32 could include a motorized system to power wheels that are riding on first side upper rail 24 and first side lower rail 26 but may also include other mechanisms. As one example, a pulley system could be coupled between first side exoskeleton system 28 and rails 24, 26 to cause horizontal movement. Other system could be used.

As mentioned above, first wash mechanism 20 and second wash mechanism 60 are mirror images of one another and contain similar components. More specifically, second side wash mechanism 60 includes a plurality of uprights 62, a second side upper rail 64 and a second side lower rail 66, again movably supporting a second side exoskeleton system 68 (also referred to as a rail cart or a carriage assembly). Further, a second side tray 70 is rotatably coupled to exoskeleton system 68 in a manner allowing it to rotate about an axis 71. Again, second side pusher 74 allows second side pusher manifold 76 to move laterally away from and back toward tray 70, thus allowing it to be positioned adjacent to a side surface of a vehicle positioned within wash zone 16. Further, second side pusher manifold 76 supports a plurality of second side nozzle 78, which again are used to provide washing fluids utilized during the wash process. A second side drive 72 is utilized to cause exoskeleton 68 to move along second side upper rail 64 and second side lower rail 66 in a desired manner.

As best illustrated in FIGS. 1A, 1B and 3, first side wash mechanism 20 and second side wash mechanism 60 also include a first side tracer arm system 40 and a second side tracer arm system 80, respectively. First side tracer arm system 40 is also movably coupled to exoskeleton 28 in a manner that allows it to be carried along first side upper rail 24 and first side lower rail 26. Further, first side tracer arm system 40 also includes a tracer drive 42 which allows movement vertically along a vertical track 23 coupled to exoskeleton 28. Also coupled to first side tracer drive 42 is a first side tracer plate 43 and tracer manifold 46 which extends through tracer plate 43 and laterally into wash zone 16. First side tracer manifold 46 also supports a plurality of first side tracer nozzles 48. As discussed below, these nozzles 48 are utilized to provide washing fluids used during the wash process. As also shown, second side tracer arm system 80 includes similar components including a second side tracer drive 82, a second side tracer plate 83, a second side tracer manifold 86 and a plurality of second side tracer nozzles 88. Second side tracer drive 82 is coupled to second side exoskeleton 68, again allowing movement vertically. As will be appreciated, by allowing vertical movement along exoskeleton 28 and exoskeleton 68, and by being carried by those components will allow first side tracer manifold 46 and second side tracer manifold 86 to be placed at nearly any location within wash zone 16. It should also be appreciated that first side tracer manifold 46 and second side tracer manifold 86 are also rotatable about their longitudinal axis. This will allow first side tracer nozzles 48 and second side tracer nozzles 88 to be directed toward a vehicle as necessary to achieve optimum cleaning. As examples, this could include aligning first side tracer nozzles 48 and second side tracer nozzles 88 at predetermined angles with respect to the surface of the vehicle to provide optimum cleaning and/or to deal with forces created during fluid spray operation.

Again, FIGS. 1A & 1B are both top views of embodiments of wash system 10, with FIG. 1B showing cross members 14 between first side uprights 22 and second side uprights 62. Again, certain advantages are provided when cross members 14 are not used. Further, a representation of vehicle 100 is illustrated in FIG. 1B to provide additional context. Similarly, FIG. 2C shows vehicle 100 within wash zone 16.

Turning now to FIG. 3, a side view of wash system 10 is presented, with vehicle 100 shown within wash zone 16. Second side uprights 62, second side upper rail 64 and second side lower rail 66 are shown in front of vehicle 100. Also shown is second side exoskeleton 68, which again is movable along second side uprights 62 and second side upper rail 64. Further, it is contemplated that components and systems can be configured differently. As one example, a single side rail could be used, as opposed to the pair of side rails illustrated in the various figures.

Referring again to the embodiment illustrated in FIG. 1, a first light sensor 92 and a second light sensor 94 are positioned at an entryway 14 to form a light curtain. Using these sensors, a light curtain exists between these two elements, and allows a vehicle to be "scanned" as it enters wash zone 16. These sensors provide critical information for a control system (not shown in FIG. 1) which will control operation of the multiple components to carry out the efficient and effective wash process. As set forth below, alternative methods of sensing certain components of the vehicle, or scanning (profiling) a vehicle are possible.

Figure 4:
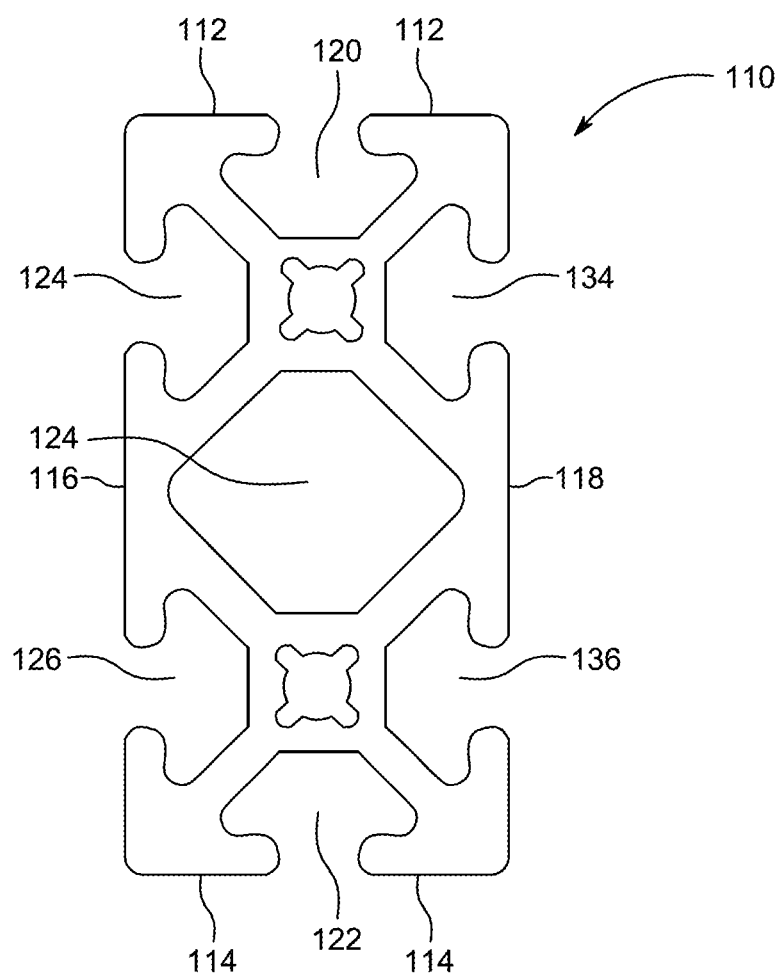
FIG. 4 is a cross-sectional view of one split rail assembly.

Again, first side upper rail 24, first side lower rail 26, second side upper rail 64 and second side lower rail 66 are all utilized to support and allow movement of several components. To enhance and allow the movement of these components, while also providing unnecessary structural support, a uniquely designed rail is utilized. Turning now to FIG. 4, a cross-sectional view of one exemplary rail is shown. As will be appreciated, rail 110 illustrated in FIG. 4 is specifically configured to abide necessary levels of structural support, while also allowing the above-mentioned exoskeleton systems and wash systems to move as required. It is contemplated that exemplary rail 110 is an extruded element, having a constant cross-section in its entire length. In the embodiment illustrated in FIG. 4, side rail 110 provides one example of a possible rail configuration. It will be understood that side rail 110 could be utilized as any one of the above-mentioned side rails including first side upper side rail 24, first side lower side rail 26, second side upper side rail 64 and second side lower rail 66.

As specifically illustrated in FIG. 4, rail 110 has an upper surface 112, a lower surface 114, a first side surface 116 and a second side surface 118. As also illustrated, a number of recesses are configured in each of these side surfaces to accommodate the support and movement of other components. More specifically, an upper recess 120 and a lower recess 122 extend inwardly from upper surface 112 and lower surface 114, respectively. In this embodiment, the side surfaces each have two recesses, with first side surface 116 having an upper recess 124 and a lower recess 126 while second side surface 118 has an upper recess 134 and a lower recess 136. Rail 110 also includes a central recess 124 which helps to minimize weight while also providing sufficient strength and rigidity. As will be further discussed below, each of these various structures formed in rail 110 help to support these significant loads carried by these components. As will be further appreciated and as generally mentioned above, the various components utilized or necessary to accomplish washing operations can be extremely heavy, thus providing undesired loads on the various components. The management and handling of these loads is critical. As will also be apparent, the structure of rail 110 will also help to provide a streamline and efficient support structure. Stated differently, these components can be easily coupled to uprights in a manner that will provide support, while also allowing for any necessary movement along the rail.

Figure 5:
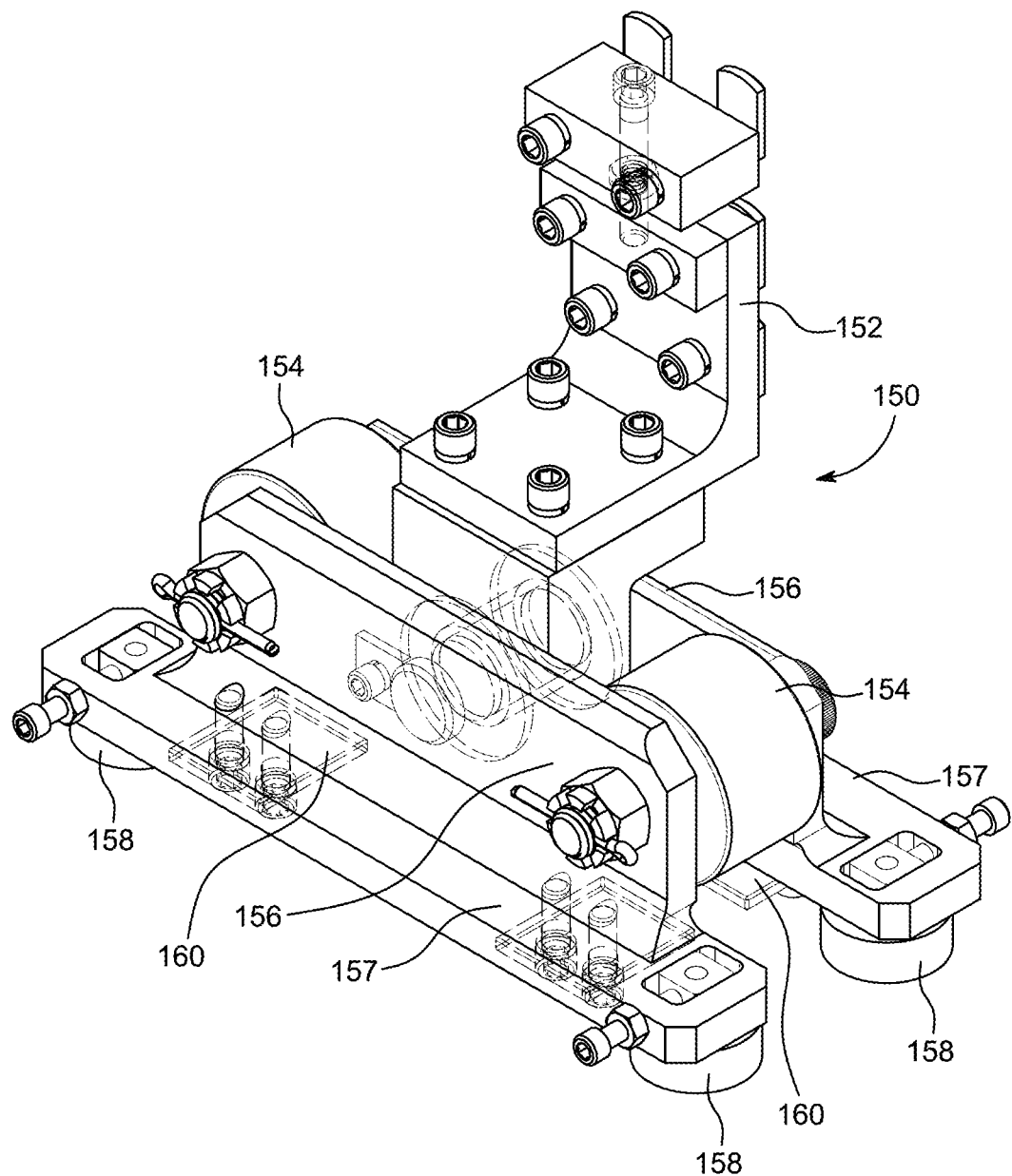
FIG. 5 is a perspective view of a guided wheel assembly used in the embodiments of the previous figures.

Turning now to FIG. 5, a perspective view of a guided wheel assembly 150 is shown. In this particular embodiment, rail guided wheel assembly 150 is specifically configured to effectively and efficiently cooperate with rail 110, discussed above in relation to FIG. 4, and allow movement/positioning of all washing components. Generally speaking, rail guided wheel assembly 150 is configured to ride along a top surface 112 of rail 110, while also having various components which are configured to ride within recess 124 and recess 134. This cooperation will help to accommodate the significant loads on these components produced by the wash systems they are carrying. Again, rail guided wheel assembly 150 is utilized to retain and support exoskeleton systems 28, 68 and all related components. It is contemplated that at least two rail guided wheel assemblies are used for each exoskeleton, however different variations are possible.

In other embodiments, four rail guided wheel assemblies may be needed for each exoskeleton. More specifically, rail guided wheel assembly 150 will include a pair of main wheels 154 that are designed to ride along the top surface 112 of rail 110. Main wheels 154 are supported by a wheel assembly frame 156, positioned on either side thereof. Wheel assembly frame also has lateral support portions 157 that are configured to support a plurality of guidewheels 158, which cause wheel assembly to be continuously aligned with respective rail 110. Further, a number of internal alignment tabs 160 are positioned on a bottom portion of wheel assembly 150 and are specifically configured to be contained within recesses 124 and 134 mentioned above. Alignment tabs 160 also act as an anti jump system. In case the rail cart gets jammed or a hard-strike by a vehicle, tabs 160 act as a safety device and will prevent the wheel assembly from falling off extrusion assembly 110. By appropriately configuring mainwheels 154, and guidewheels 158, a rigid and effective carrying structure is provided that will maintain alignment with the desired rails 110, while also allowing smooth movement along the respective rail 110. Further, this structure is capable of carrying considerable amounts of weight, and distributing along the various guidewheels and mainwheels 154, as necessary.

In addition to the details outlined above, using two rails causes the center of gravity to be very close to the rails themselves (even with the pusher extended out). The top rail wheel assembly wants to naturally fall towards the wash zone while the bottom wheel assembly wants to move away from the wash zone. These opposing forces force the center of gravity very close to the rails, thus allowing the ability to better control/handle the total weight of the rail cart.

Figure 6:
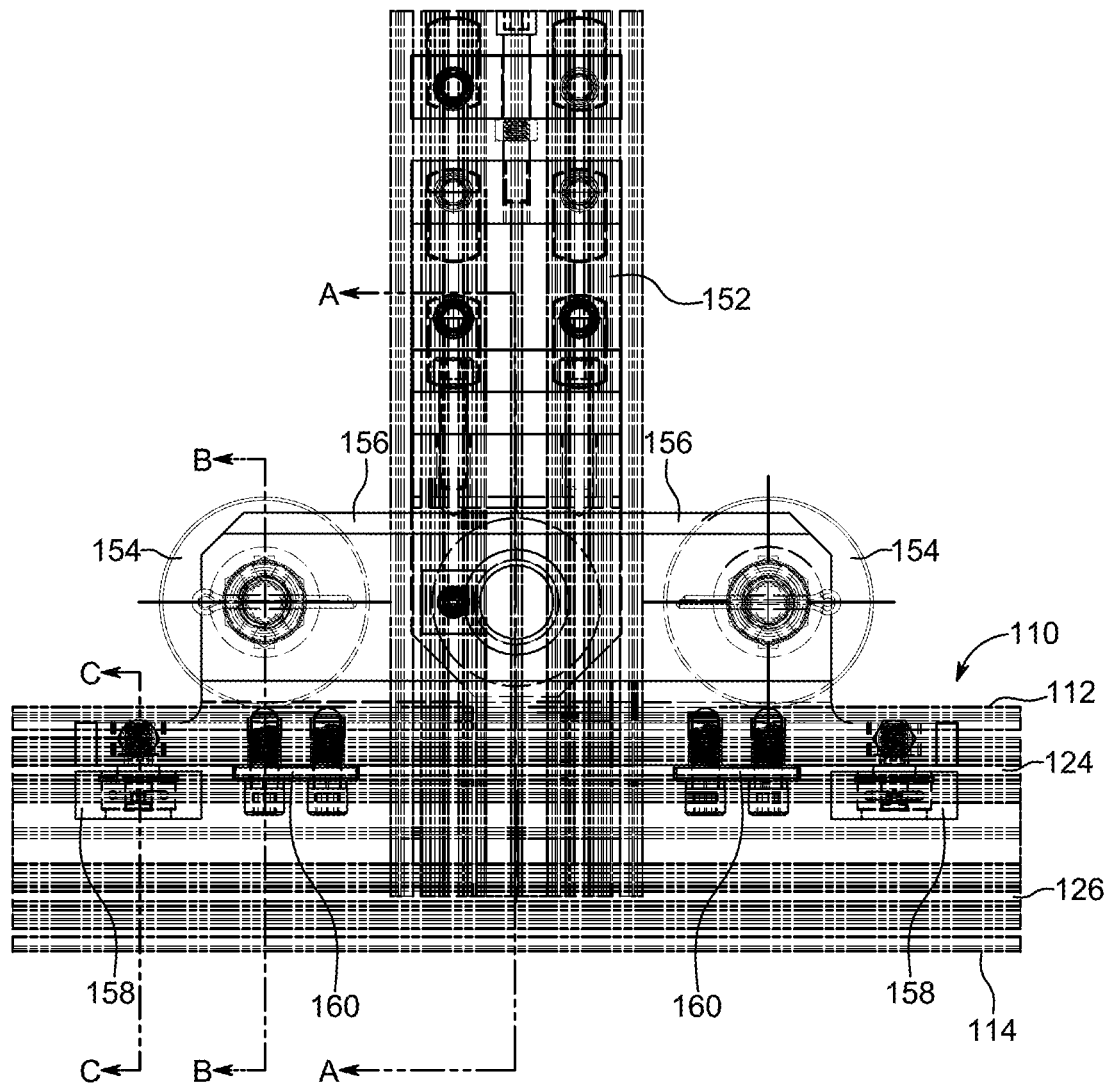
FIG. 6 is a partially transparent side view of the guided wheel assembly.
Figure 7:
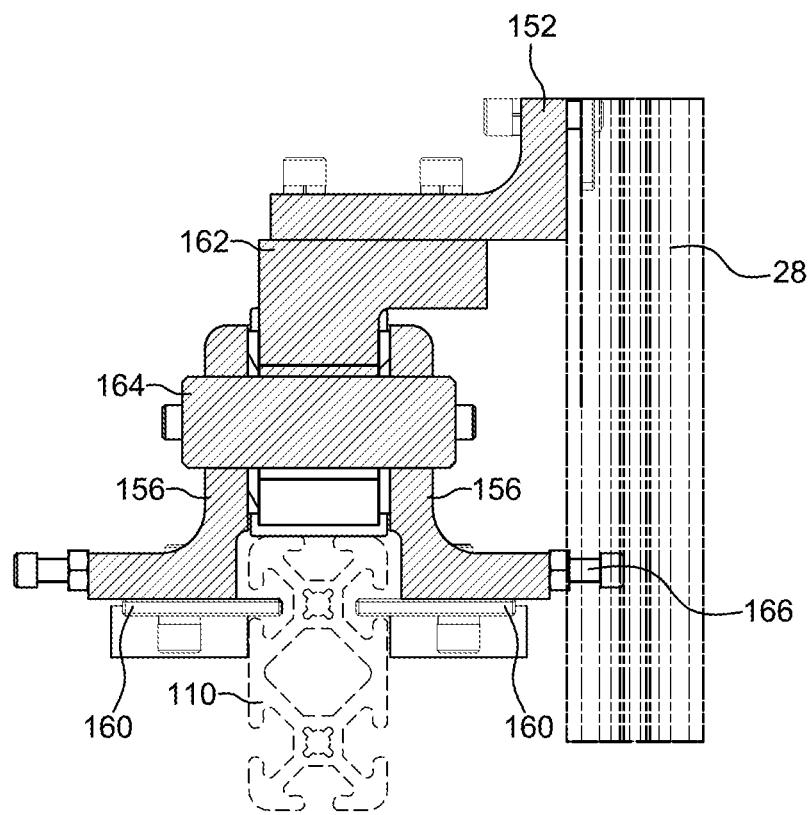
FIGS. 7 and 8 are cross-sectional views of the guided wheel assembly.
Figure 8:
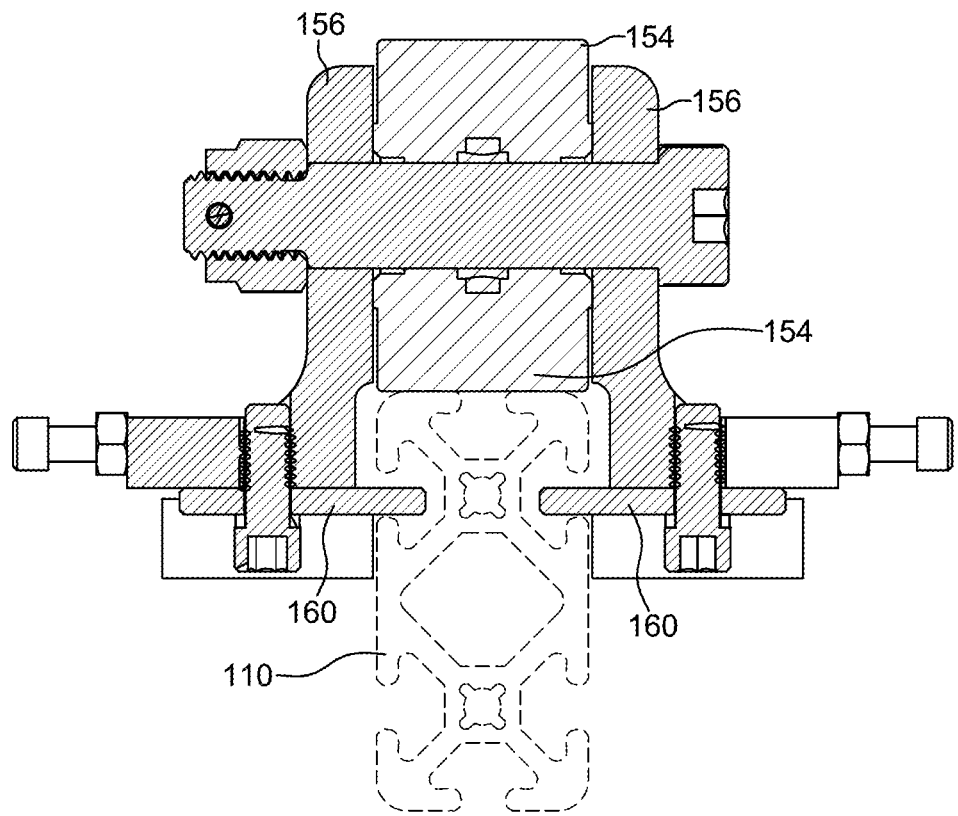

In the embodiment illustrated in FIG. 5, an angle bracket 152 is primarily utilized to provide a connection between rail guided wheel assembly 150 and the above-mentioned exoskeleton systems 28, 68. As will be discussed further below, angle bracket 152 is used to accommodate attachment to a rail cart extrusion which is one component of the exoskeleton systems 28, 68. To further help in understanding the configuration of rail guided wheel assembly 150, FIG. 6 provides a front view thereof, while FIGS. 7 and 8 provide various cross-sectional views better illustrating coupling with rail 110. As best illustrated in FIG. 7, angle bracket 152 is coupled to other components via a pivoting framework 162. A pivoting framework 162 more specifically is coupled to mainframe work 156 via a connection pin 164, thereby allowing for some amount of rotation and accommodating for irregularities that might exist. As also illustrated in FIG. 7, certain portions of exoskeleton system 28 is coupled to a rail guided wheel assembly 150 via angle bracket 154, and a connection pin 166 which is coupled to bracket 156. Again, this provides for effective weight distribution and management of loads.

Figure 9:
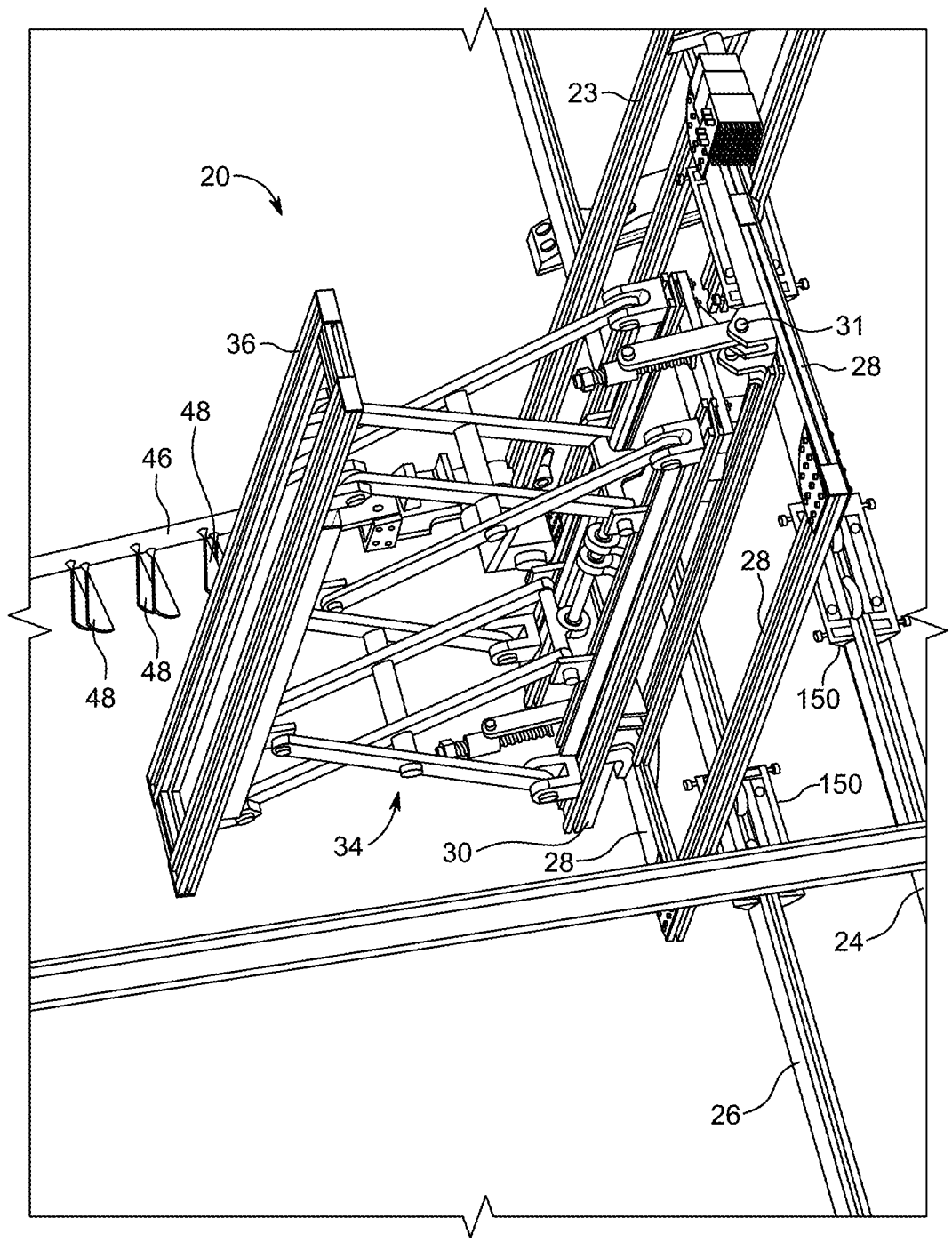
FIG. 9 presents a top/perspective view of the tray mounting mechanism and side wash system.
Figure 10:
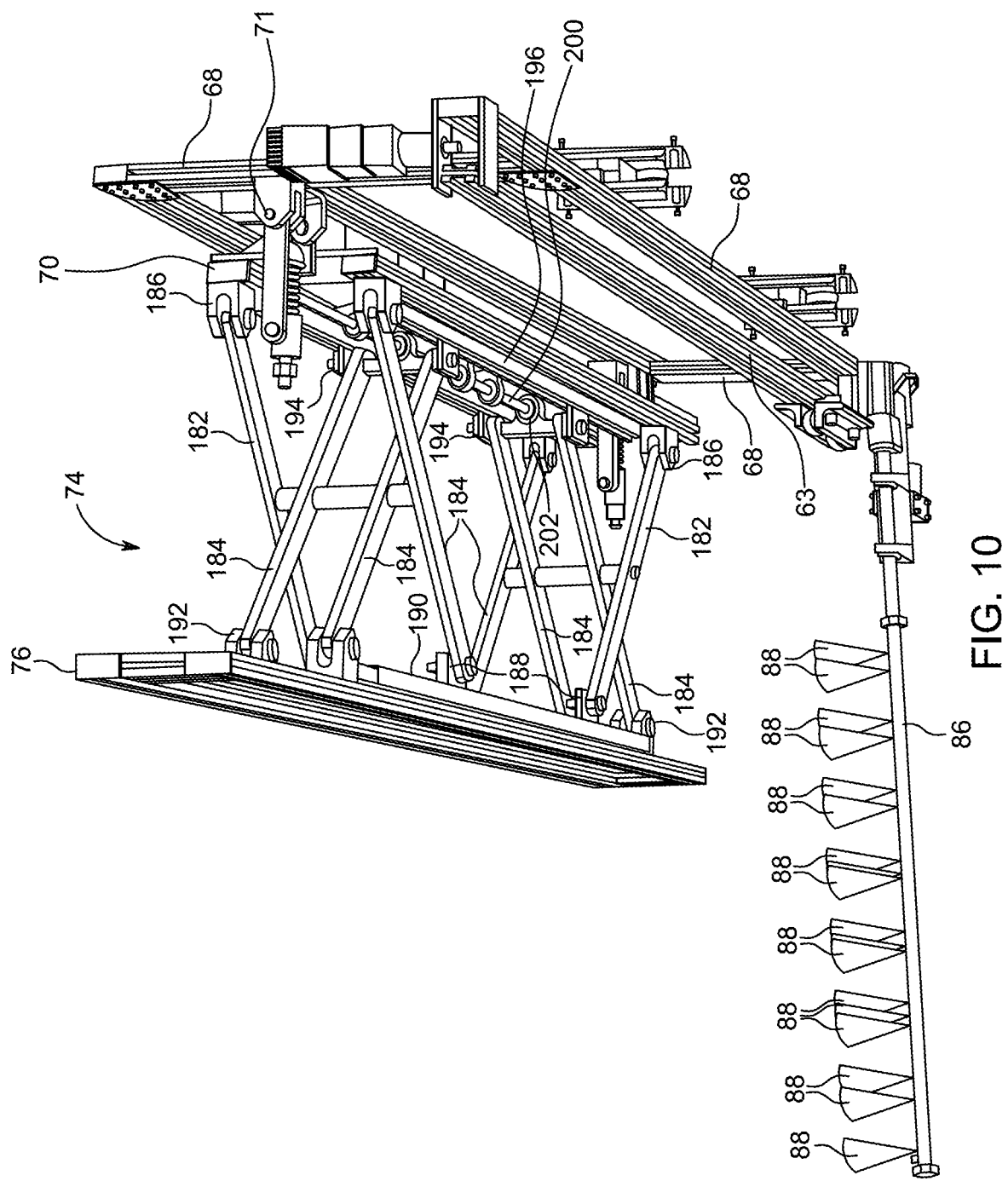
FIG. 10 illustrates further details of the pusher mechanism and tracer arm system.

As discussed above, first side tray 30 and second side tray 70 are rotatably coupled to the corresponding first side exoskeleton 28 and second side exoskeleton 68, respectively. First side tray 30 and second side tray 70 also support first side pusher 34 and second side pusher 74, respectively. FIGS. 9 & 10 presents better views of these components, and the way connections are achieved. As will be appreciated, FIG. 9 presents a view of first side wash system 20, with the upper rail 24 and lower rail 26 shown. First side exoskeleton 28 is coupled to upper rail 24 and lower rail 26 via a plurality of rail guided wheel assemblies 150. From a slightly different perspective, FIG. 10 shows second side exoskeleton 68 without second side upper rail 64 and second side lower rail 66. In this view, second side pusher 74 and second side manifold 76 are better illustrated.

It will be recognized that second side pusher 74 is a scissor mechanism 180 having two pairs of outer scissor legs 182 and two pairs of inner scissor legs 184 which are operatively coupled to tray 70 and manifold 76. More specifically, outer scissor legs 182 are coupled to tray 70 at a first end using a number of fixed pivot joints 186 and coupled to manifold 76 at an opposite end using a number of sliding pivot joints 188. In this embodiment, sliding pivot joints 188 will slide along a track 190 attached to manifold 76. In a similar manner, inner scissor legs 184 are coupled at a first end to manifold 76 using a plurality of fixed pivot joints 192, while the opposite end of scissor legs 184 are coupled to tray 70 using a plurality of slidable joints 194. A tray mounted track 196 will support slidable joints 194. To provide movement, a pusher drive motor 198 (not shown) is mounted to tray 70 and is configured to cause movement of pusher 74. In this embodiment, drive motor 198 is a rotary motor coupled to a screw drive 199. As will be appreciated, screw drive 200 is coupled to drive brackets 202, which will cause the ends of inside scissor legs 184 to be moved along track 196. Those skilled in the art will easily recognize that this movement will cause manifold 76 to be moved in desired directions. Again, Tray 70 is coupled to exoskeleton 68 in a manner that allows rotation about a break away axil 71. A spring-loaded breakaway structure 73 is utilized to generally hold components in place while also providing the desired safety features. It will further be recognized that alternative drive motors could be used to operate the pusher mechanisms, such as hydraulic cylinders, electric motors, etc.

Figure 11:
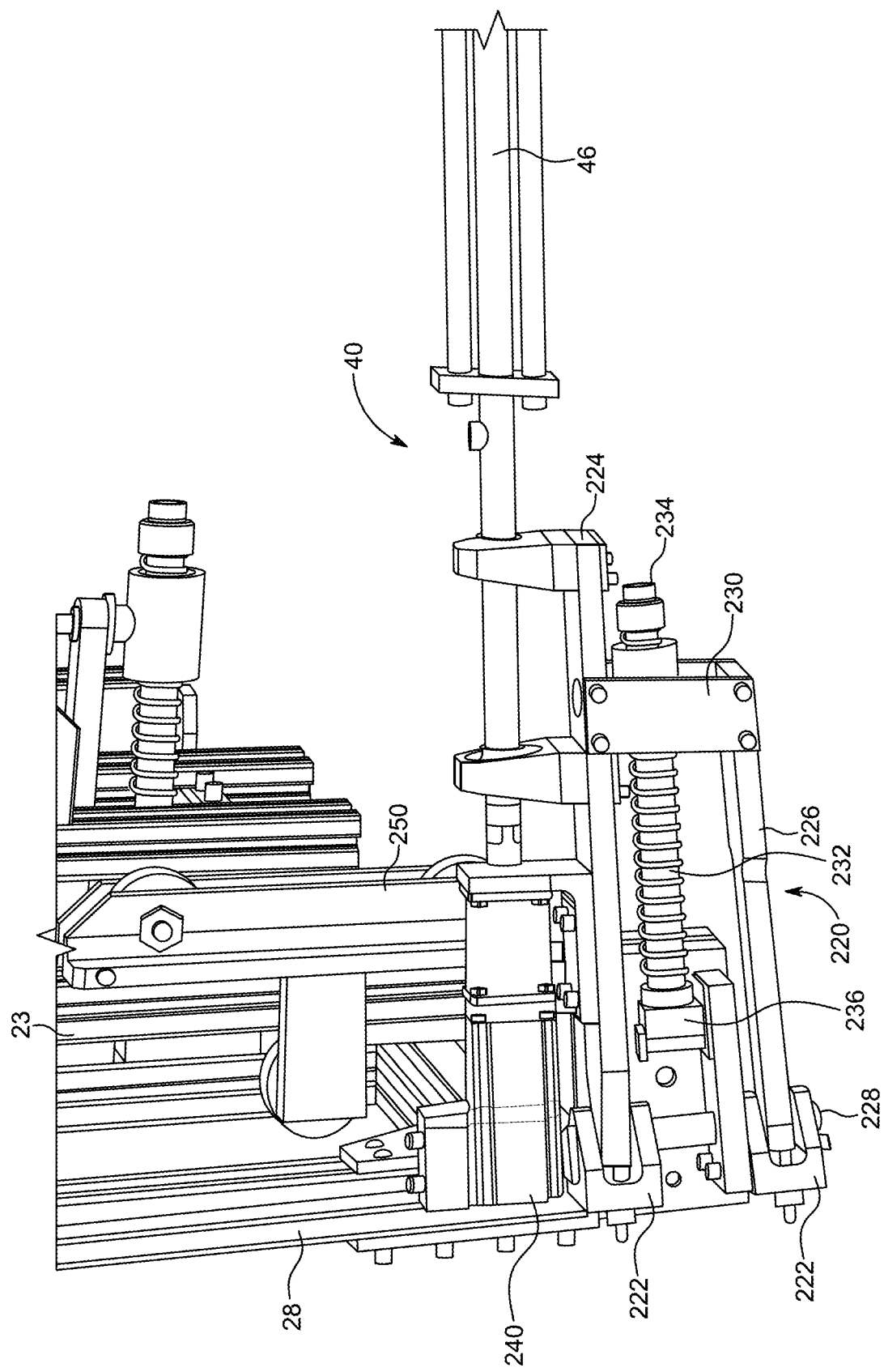
FIG. 11 shows the breakaway mounting mechanism for the tracer arm systems.
Figure 12:
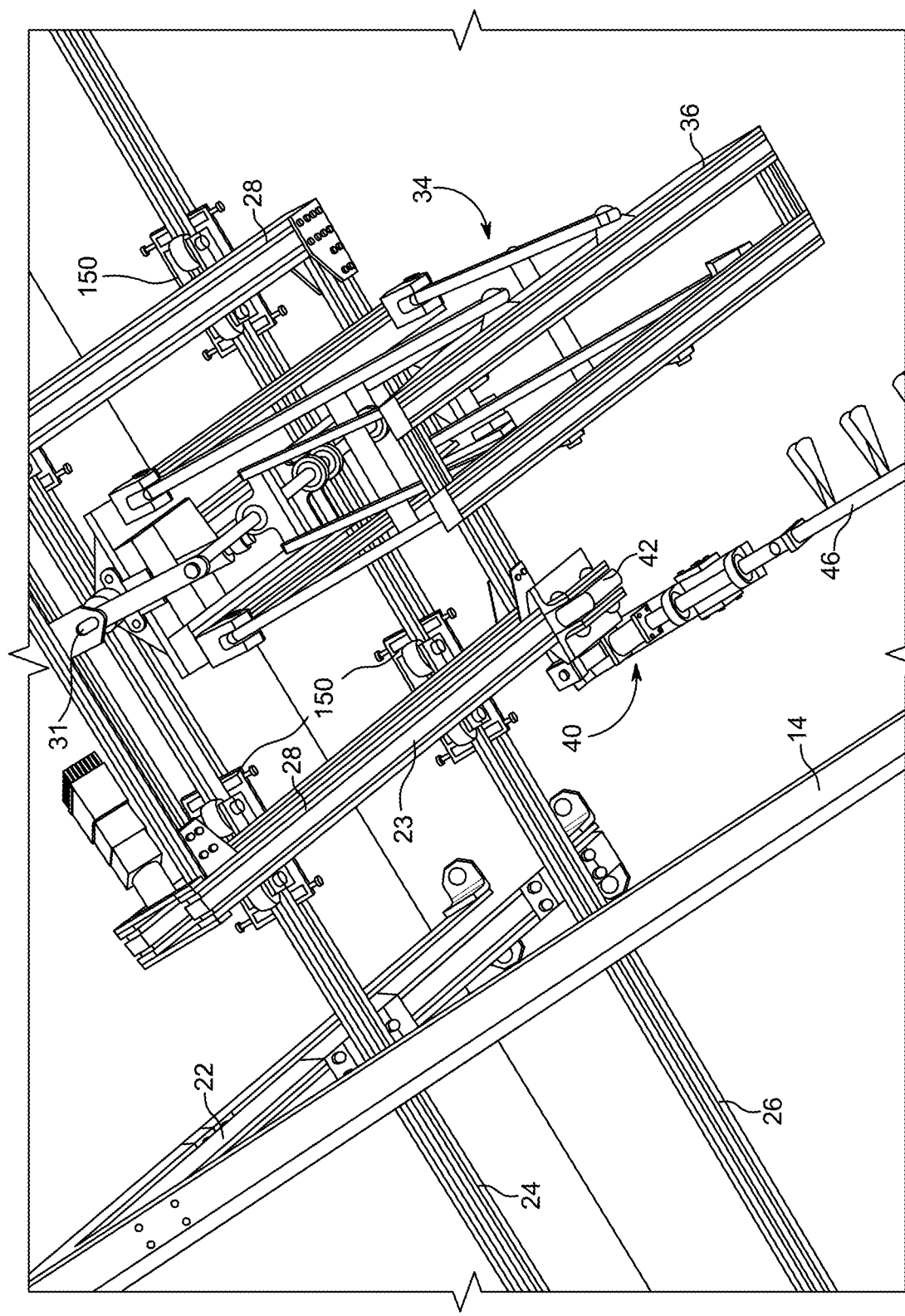
FIG. 12 provides a perspective view of the exoskeleton and the rail cart extrusion which carries the pusher mechanism and tracer arm.

Again, wash system 10 makes use of first side tracer arm system 40 and second side tracer arm system 80 to wash those portions of a vehicle that are generally on the front, back and top. As discussed, it is important to provide effective wash systems to achieve the desired levels of cleaning, but also to have several levels of safety to avoid vehicle damage. One such safety system is the breakaway mechanism designed into the tracer arms. FIG. 11 provides a focused view of the breakaway mechanisms 220 used to support first side tracer arm system 40. As shown, this includes a pair of pivot brackets 222 which accommodate a first support arm 224, a second support arm 226, and a coupling pin 228. A connecting block 230 extends between first support arm 224 and second support arm 226 so that these two elements will move together. A retaining spring 232 and retaining pin 234 are used to provide a retaining force (directed toward pivot brackets 222) to help keep support arms 224, 226 in a preferred "home" position. More specifically, a slide block 236 is uniquely designed to provide pressure (i.e., the retaining force) against a framework member 238. When pressure is applied against first side tracer arm system 40, this retaining force will eventually be overcome, thereby allowing rotation about coupling pin 228. Once any obstructions are cleared, the first side tracer arm system can be reset, by moving back to this "home" position. Those skilled in the art will recognize that further safety could be provided by adding padded surfaces to the tracer arm systems 40, 80 and spray manifolds 36, 76.

FIG. 11 also illustrates a tracer manifold drive 240, used to cause rotation of tracer manifold 46. As will be appreciated, this will allow tracer arm nozzles to be directed in several directions. Manifold drive 240 is supported by upper support arm 224 and will rotate with the assembly when breakaway actions are necessary. While only portions of exoskeleton 28 are illustrated, it is also can be seen how a tracer arm wheel assembly 250 is used to allow tracer arm system 40 to move up and down.

Figure 13:
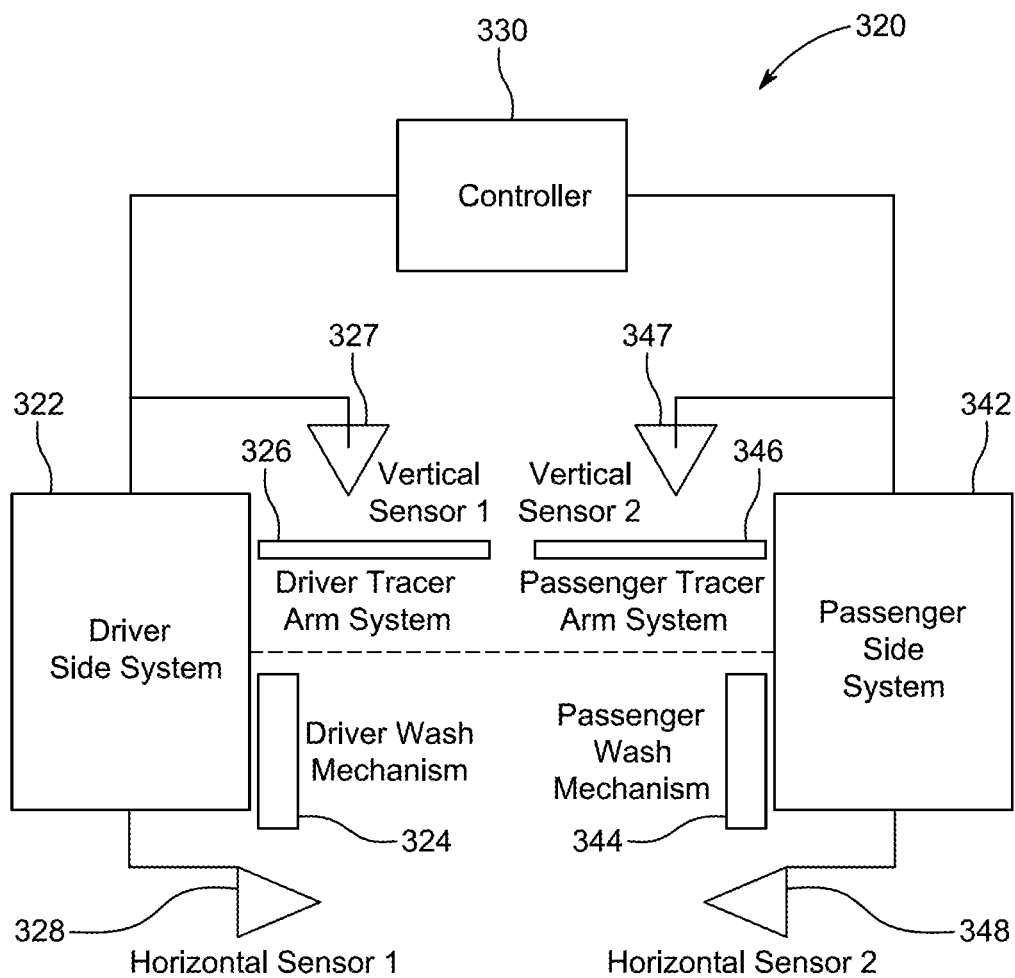
FIG. 13 is a block diagram illustrating the control system used to coordinate operation of the wash system.

FIG. 13 provides a high-level outline of the control system 320 used to coordinate operations of the wash system 10. As shown a driver-side system 322 and a passenger-side system 342 are in communication with a controller 330, and with each other. The controller 330 is used to actuate multiple drive motors in both the driver-side system 322 and the passenger-left side system 342. In addition, the controller 330 will cause these motors will move wash mechanisms 324, 344 and tracer arm systems 326, 346 as needed to carry out wash operations. These systems (driver-side system 322 and passenger-side system 342) are set up in a master/slave configuration to avoid unwanted operations of the components. Additionally, vertical sensors 327, 347 and horizontal sensors 328, 348 are included. In one embodiment discussed below in relation to FIGS. 15 and 16, the horizontal sensors include 16-eye multiplexed optical sensors, used to map the profile of the vehicle from the side during trace operations. It is further contemplated that any number of sensor eyes could be used. Further, it is possible that a dual radar sensing systems could also be used as an alternative to each of the pair of vertical sensors (i.e., at least four radar sensors are used). It should be noted that controller 330 is capable of comprehensive control of wash system 10, including monitoring and resetting during operation. Further, this will coordinate the overall wash process, which may include multiple passes (tracing passes, soap passes, wash passes, etc.)

Figure 14:
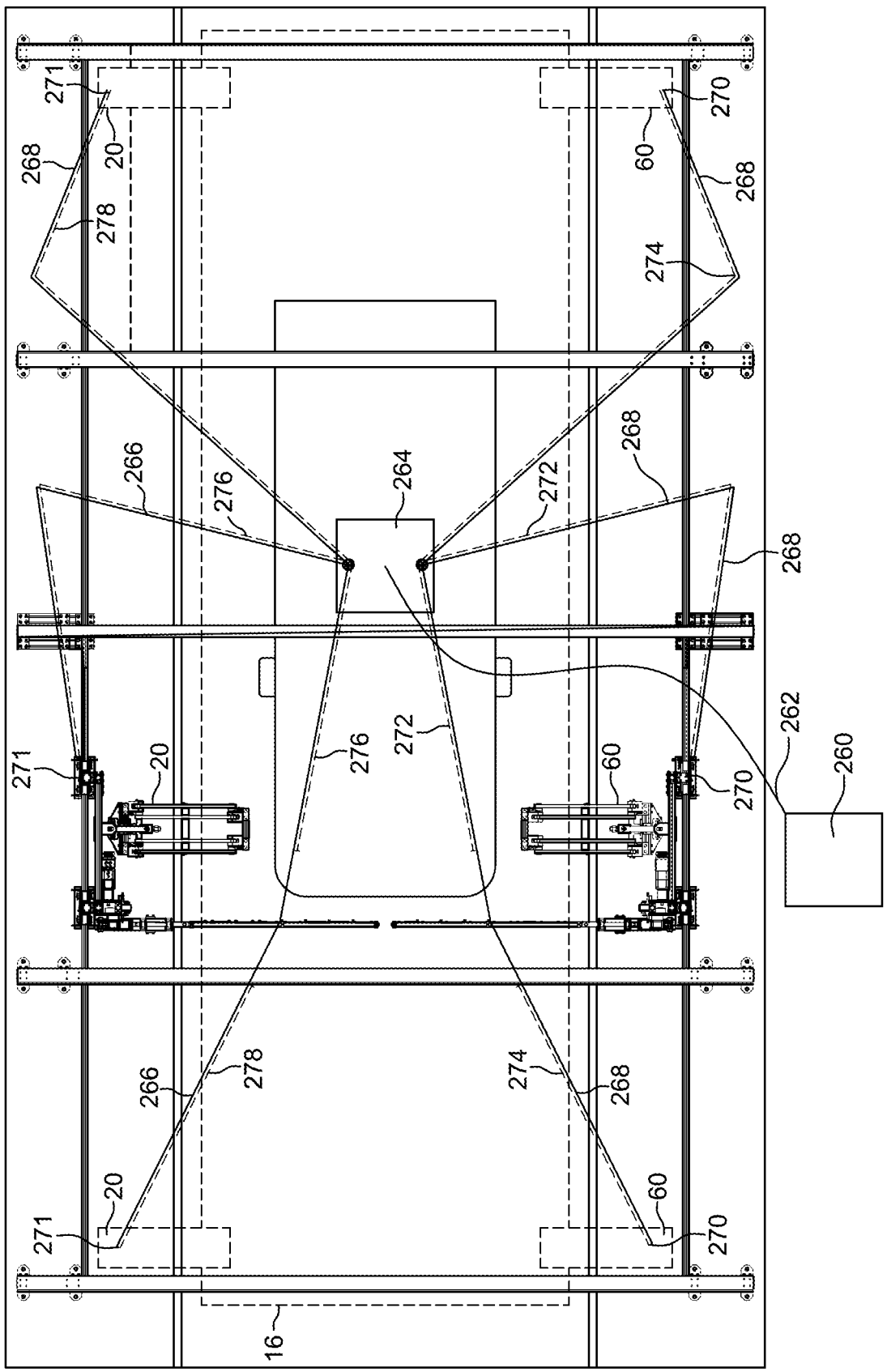
FIG. 14 illustrates the fluid handling approach used by the wash system.

As generally discussed above, several nozzles are utilized in the wash system to achieve efficient and effective cleaning. FIG. 14 illustrates one exemplary approach to handling hoses, cabling and fluid handling equipment in a manner that will effectively allow movement of the left-side wash system and right-side wash system discussed above. FIG. 14 schematically illustrates a control room to 260 which will include pumps and fluid handling equipment, along with control panels and other necessary power supplies. In one embodiment, it is contemplated that a main supply run 262 will carry fluid power and control signals to a central hub 264 located generally above the wash zone 16. Central hub 264 can include a water manifold and electrical switching equipment as necessary. As further illustrated, a first side run 266 and a second side run 268 provide the necessary cables and hoses to supply fluid, power and control signals to first-side wash system 40 and second-side wash system 80. In FIG. 14, first-side wash system 40 and second-side wash system 80 are schematically illustrated in various positions, with essential positions shown in solid lines, while the extended positions shown in dashed lines. Extending from main hub 264 is a first guide rod 276 (shown in dashed lines), which is rotatably accoupled to central hub 264. Similarly, a second guide rod 272 (again, shown in dashed lines) extends from central hub 264 in a similar manner. In a similar manner, a first side guide rod 278 and a second side guide rod 274 (shown in dashed lines) extend from first side wash system 40 and second side wash system 80, respectively. For illustrative purposes, first side guide rod 278 and second side guide rod 274 are shown coupled to a portion of the respective rail cart. These are also rods or bars that are held in a horizontal manner, generally, and allowed to rotate. A portion of first side run 266 is coupled to first side guide rod 276, and first side wash system guide rod 278, to maintain hoses and power cables in a desired manner. Similarly, second side run 278 is coupled to both second side rod 272, and second side wash system guide rod 274 to similarly managed cables. As shown, by having these systems be partially rigid, and having cables with additional length available, all hoses and power and control cables are able to stay in connection with first side wash system 40 and second side wash system 80 as they travel the entire length of the wash zone 16. While this approach is certainly one effective mechanism for managing hoses and cables, those skilled in the art will recognize that other approaches could be utilized. For example, a sliding hose system could be positioned above each of the siderails, and simply travel in an accordion type format to allow and accommodate for movement.

In the embodiments discussed above, and as generally illustrated in FIG. 14, the wash system 10 can be uniquely configured and controlled to wash both sides of a vehicle simultaneously. This is made possible via appropriate fluid handling systems, including hoses, manifolds and control valves which are controlled by controller 330, to allow for the simultaneous operation of both passenger-side wash system 20 and driver-side wash system 60. In this manner, washing solutions and rinse water can be provided from either side of the vehicle (and above) to create a balanced washing approach. Further, the coordinated operation of the side spray nozzles 38, 78 and tracer arm nozzles 48, 88 can be coordinated so that wash patterns are optimized. For example, the coordinated operation of these nozzles can insure that the side spray nozzles 38, 78 does not prematurely rinse the hood or roof of a vehicle before a predetermined rinse pattern is applied by tracer arm nozzles 48, 88.

Figure 15:
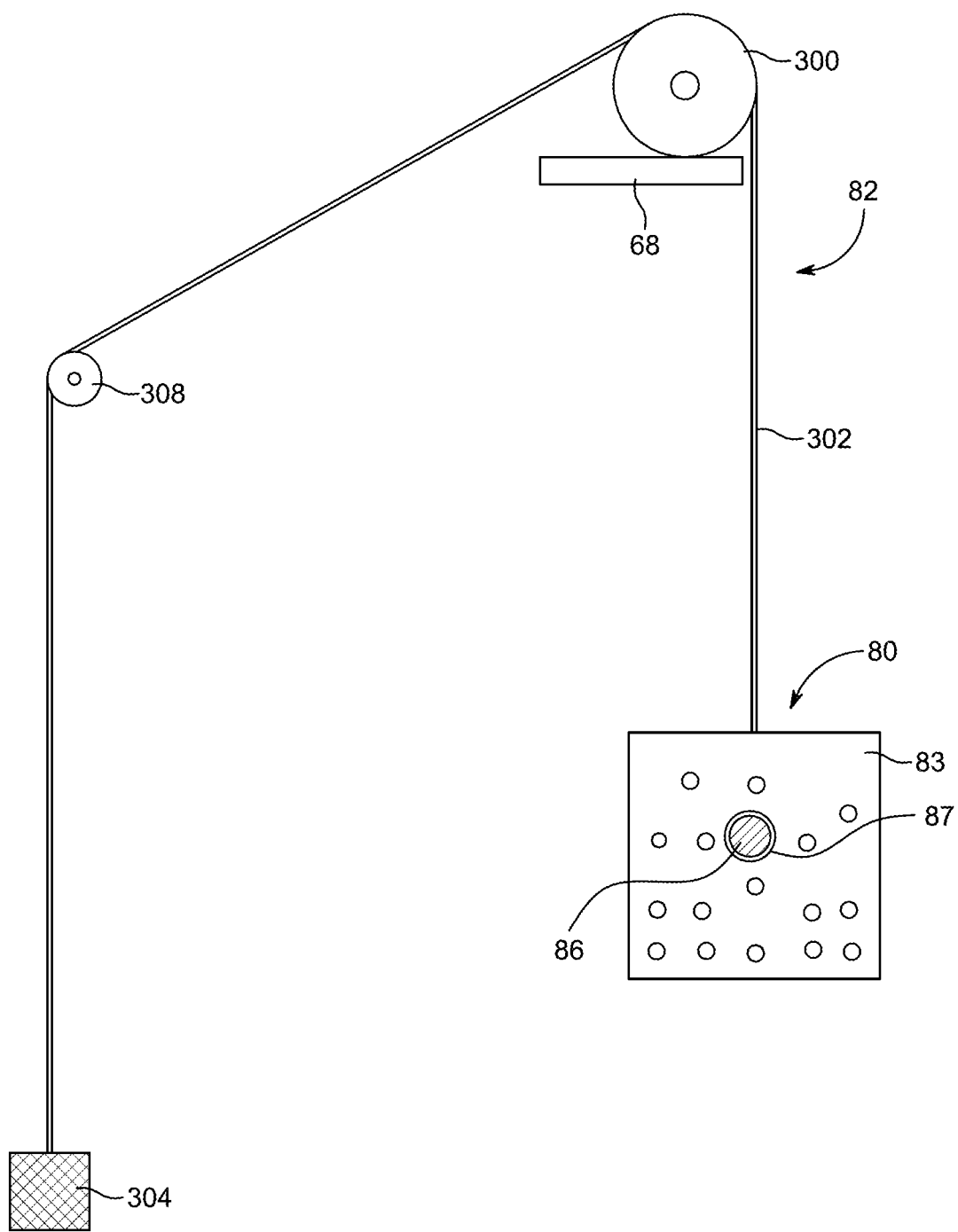
FIG. 15 presents a schematic view of the tracer manifold actuation assembly.

As generally discussed above, the use of tracers, and specifically first tracer arm 46 and second tracer arm 86, as extended into the wash zone is a beneficial feature of the present wash system. Generally illustrated in FIG. 15 is a one embodiment of a drive mechanism, 82 which is capable of allowing tracer system 80 to move in a vertical manner. In this embodiment, a vertical drive motor 300 is mounted on a particular portion of exoskeleton 68. A pulley belt 302 is coupled to second side tracer arm system 80, and a counter wake 304. A second pulley 308 is utilized to maintain spacing and appropriately position counterweight 304. As will be appreciated, driving motor 300 will allow second side tracer system 80 to move vertically, as desired, while counterweight 304 will balance this movement. As will be appreciated, use of counterweight 304 allows motor 300 to be of reasonable size and does not require significant levels of power.

Figure 16:
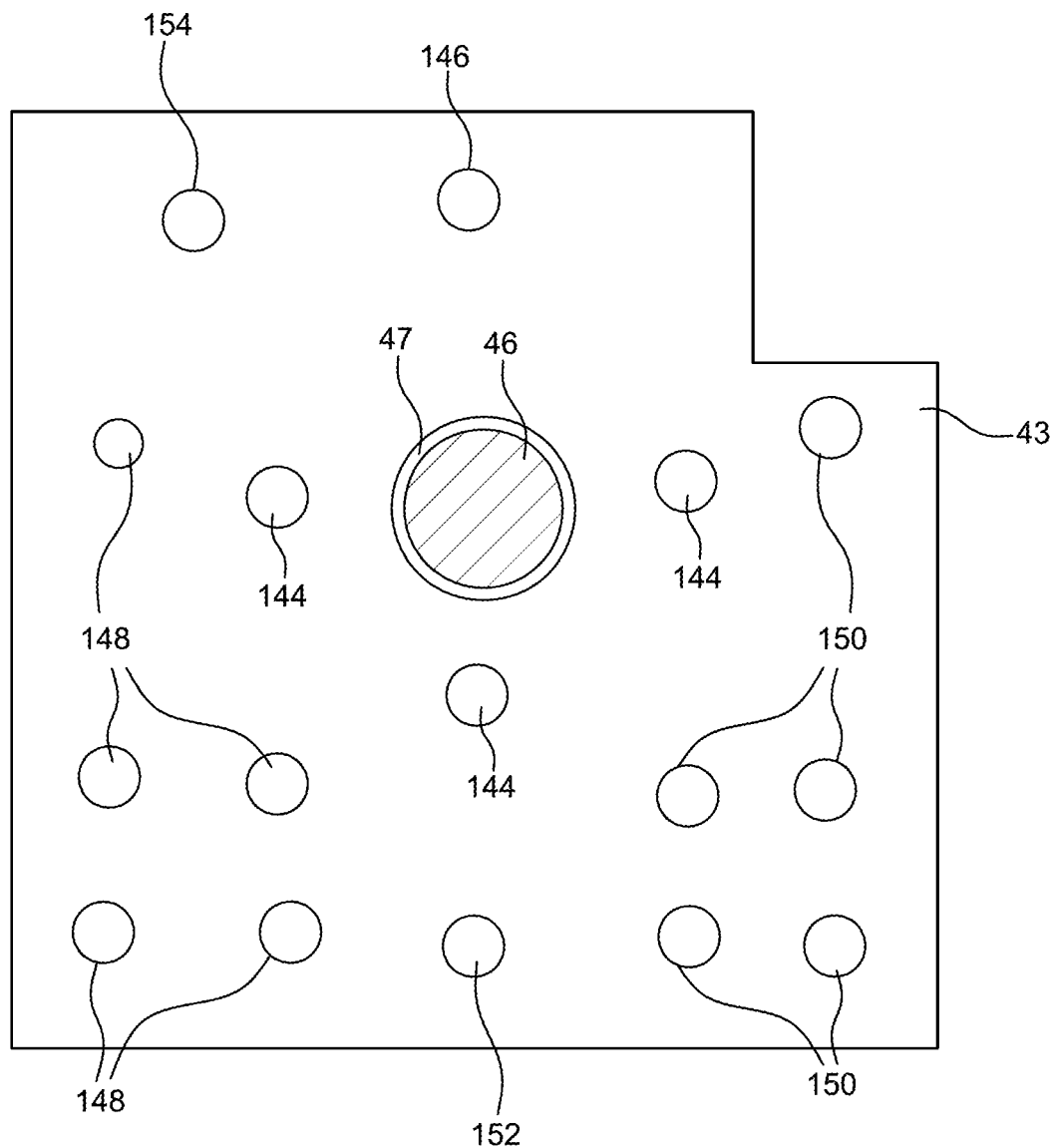
FIG. 16 shows a front view of the tracer plate.

While certain aspects of "tracing" a vehicle have been discussed above, FIG. 16 better illustrates one structure utilized to carry out one example of a tracing process. More specifically, FIG. 16 shows a front view of a tracer eye holding plate 43, which is coupled to first side tracer arm system 40. More specifically, a tracer eye holding plate 43 will be positioned in a manner to be adjacent tracer drive 42 and allows tracer arm 46 to tracer manifold 46 to extend therethrough (see e.g., FIG. 1A and FIG. 2B). In this particular embodiment, tracer eye holding plate 43 is configured to support 16 different tracer eyes. Each tracer eye is a portion of a paired tracing system, which provides a line-of-sight type sensor and will determine when a particular component is obstructing that line of sight. It will be noted that this is very similar to most automated garage door safety systems, which have a safety eye located near the floor and adjacent the garage door. In this particular embodiment, these tracer eyes include a trio of tracer arm eyes 144 which are positioned around and adjacent to tracer arm 146. Tracer arm eyes 144 act as safety eyes and will indicate when tracer arm 46 may be getting undesirably close to a portion of a vehicle. Similarly, an upper safety eye 146 exists at an upper portion of tracer eye holding plate 43. This also provides a safety sensor, affiliated with tracer arm 46. In this embodiment, five front vehicle eyes 148, and five rear vehicles eyes 150 are carried by tracer eye holding plate 43 and positioned respectively on either side of tracer arm 46. In addition, a lower facing eye 152 and an upper facing eye 154 are also included. It will be appreciated that second side tracer eye holding plate 83, will contain a similar configuration of tracer eyes, such that matched pairs are affiliated with one another.

Using the configuration of tracer eyes carried by first side tracer eye holding plate 43 and second side tracer eye holding plate 83, considerable amounts of information can be obtained related to the overall profile of a vehicle. It is contemplated that the control system of wash system 10 will cause a number of passes to be completed once a vehicle has entered the wash zone 16, thereby allowing all of the above-mentioned sensor eyes to detect the relative positions and locations of the vehicle profile, as these passes are being completed. In one embodiment, there are two tracer passes, before a final wash pass is accomplished. In each of these tracer passes cleaning materials can be applied while also carrying out the desired traces. In this particular instance, such cleaning materials can be applied from a distance and close proximity to a vehicle is less critical. Utilizing these tracer passes, the overall profile of the vehicle can thus be determined, and the system can then be controlled for the desired close positioning and efficient cleaning.

As mentioned above, it is also contemplated that a dual radar sensing system can be utilized using vertical sensors to carryout "profiling" of the vehicle. Turning now to FIG. 2C, this concept is best illustrated, where a first side holding bracket 96 and second side holding bracket 98 are positioned at a top portion of first manifold 36 and second manifold 76 in each. This case, first bracket 96 holds a plurality of first radar sensors 97, while second bracket 98 holds a plurality of second radar sensors 99. While this approach utilizes radar sensors, as opposed to the eyes discussed above, the control and data collection methodology is similar. More specifically, these radar sensors 97 and 99 look to see the floor of the wash zone, and if the floor is obstructed this provides the determination of the position of the vehicle. This again provides another mechanism to easily profile the vehicle as it is contained within the wash zone.

As an alternative, or possibly additive approach, it is possible that various proximity sensors could be carried by first wash manifold 36 and second wash manifold 76. Turning now to FIG. 2A, a plurality of first side proximity sensors 39 are mounted to and carried by first side manifold 36, with each providing a signal indicative of a vehicle proximity thereto. Similarly, a plurality of second side proximity sensor 79 can be carried by second side manifold 76, again providing an indication of the vehicle proximity. Utilizing these sensors, a similar approach to the side proximity of a vehicle can be determined. Based upon this, the vehicle can be profiled during various passes of the wash system. Further these proximity sensors 39, 79 provide additional safety mechanisms, which will provide signals causing the wash system to stop if very close proximity is detected.

Generally speaking, each design feature of the machine supports and complements the other design features. Stated differently, the various design features all build upon one-another. A non-exclusive collection of general design features incorporated into the various embodiments of the wash system include a number of features and components that provide advantages not previously available.

As suggested above, an "OPEN TOP" split-bay and split-rail system (2 horizontal rails supporting a rail cart or wash system) provides considerable flexibility on vehicle sizes; particularly, a wide variety of vehicles heights and widths can be accommodated.

The use of a "rail-cart" carrying both the vertical lift tracer (adjacent tracer mechanisms 40 and 80) and separate pusher mechanism allows for 3-Axis "Tracing" with two independent tracer motors (tracer/pusher) and a horizontal rail cart drive. The ability to Push/Pull, move Up/Down and move Forward/Backwards provides extensive flexibility and enhanced capabilities. The control of these components is uniquely coordinated to provide the beneficial features discussed herein.

Having independent drive motors on passenger/driver side prevents "gantry-binding", which is generally described as the limitations on size and structure due to the existence of a gantry. To achieve the "open-top" concept discussed above, the overhead gantry has been replaced with independent drive systems on either side of the vehicle. While this does create the possibility of increased costs, the related increase in wash quality and expanded range of vehicle types that can be washed—cars, cargo vans, dock trucks, semitrucks, city busses, rail cars, agricultural equipment, etc.—provides worthwhile/valuable benefits.

In one alternative embodiment, a dual radar measuring system is utilized to locate the sides of the vehicle. In this system, two radar sensors are positioned adjacent to one another and directed downwardly so that one sensor will always see the floor while a companion radar sensor will detect the side of the vehicle. If the second sensor loses a view of the floor, signals will be sent out to cause the related wash system to "back up." Using this approach allows nozzles to get within 4-12 inches of the vehicle (or closer), while also safely avoiding undesirable contact. In addition to the multiple safety systems outlined above, it is contemplated that two-wire contact detection systems could be used on various components such as the wash mechanisms and tracer arms to indicate if physical contact with a vehicle has occurred. These contact detection sensors would then be able to send appropriate signals which cause the systems to shut down and retract from current positions. It is contemplated that many of these systems could be incorporated into the design of the wash system.

When drying the vehicles, several options are possible, including: (1) a chemical dry can be used (and not use blowers); or (2) an on-board drying system using much less electricity and does a better job; or (3) stand-alone dryers at the exit end of the wash. For long tunnel washes, etc., this would be extremely beneficial.

As a result of the design and components used, several beneficial capabilities are provided by the wash system discussed above: less water usage, quicker, ease of entrance for the customer, etc. Simply stated, the new style washing involves getting close to your vehicle in a controlled and safe manner.

Various embodiments of the invention have been described above for purposes of illustrating the details thereof and to enable one of ordinary skill in the art to make and use the invention. The details and features of the disclosed embodiment[s] are not intended to be limiting, as many variations and modifications will be readily apparent to those skilled in the art. Accordingly, the scope of the present disclosure is intended to be interpreted broadly and to include all variations and modifications coming within the scope and spirit of the appended claims and their legal equivalents.

The invention claimed is:

1. A vehicle wash system configured to wash a vehicle positioned within a wash zone, comprising:
    a first support track and a second support track arranged in a substantially horizontal orientation and positioned on opposite sides of the wash zone, wherein the first support track and the second support track are substantially parallel with one another;
    a first carriage assembly movably coupled to and configured to travel along the first support track, the first carriage assembly rotatably supporting a first tray;
    a second carriage assembly movably coupled to and configured to travel along the second support track, the second carriage assembly rotatably supporting a second tray, wherein the first tray and the second tray are rotatable about a substantially vertical axis;
    a sensing system configured to scan a vehicle to be washed;
    a first pusher mechanism coupled to the first tray and carrying a first set of side spray nozzles, the first pusher mechanism configured to move between a retracted position and an extended position, with the first set of side spray nozzles are closer to the wash zone when the first pusher mechanism is in the extended position;
    a second pusher mechanism coupled to the second tray and carrying a second set of side spray nozzles, the second pusher configured to move between a retracted position and an extended position, with the second set of side spray nozzles closer to the wash zone when the second pusher is in the extended position;
    a first tracer arm carried by the first carriage assembly and extending away from the first support track in a substantially perpendicular direction, the first tracer arm carrying a plurality of first tracer arm nozzles;
    a second tracer arm carried by the second carriage assembly and extending away from the second support track is a substantially perpendicular direction, the first tracer arm and the second tracer arm supporting a plurality of second tracer arm nozzles; and
    a controller coupled to a plurality of actuators configured to cause movement of the first carriage assembly, the second carriage assembly, the first pusher, the second pusher, the first tracer arm and the second tracer arm, the controller further configured to carry out a wash cycle so that the first side spray nozzles, the second side spray nozzles, the first tracer arm nozzles and the second tracer arm nozzles are moved along the vehicle in close proximity thereto during the wash cycle.

2. The vehicle wash system of claim 1 wherein the first support track comprises a first plurality of support rails, and wherein the second support track comprises a second plurality of support rails.

3. The vehicle wash system of claim 1 wherein the sensing system comprises a light curtain positioned and configured to scan the vehicle as it entered the wash zone.

4. The vehicle wash system of claim 1 wherein the sensing system comprises a plurality of sensors carried by either the first carriage assembly or the second carriage assembly or both, and wherein the wash cycle further comprises a tracer pass thereby allowing the plurality of sensors to and the controller to generate a vehicle profile, and wherein the controller is further configured to use this vehicle profile during a wash pass in a manner enabling the first side spray nozzles, the second side spray nozzles, the first tracer arm nozzles and the second tracer arm nozzles to be moved along the vehicle in close proximity thereto during the wash pass.

5. The vehicle wash system of claim 1 wherein the first tracer arm and the second tracer arm are movable in a substantially vertical direction along a first carriage assembly track and a second carriage assembly track, respectively.

6. The vehicle wash system of claim 4 wherein the first tray and the second tray are rotatably coupled to the first carriage assembly and the second carriage assembly, respectively, in a manner to allow breakaway rotation about a substantially vertical axis should any portion of the first tray, first pusher, second tray, second pusher, first side spray nozzles or second side spray nozzles come into contact with the vehicle during either the tracer pass or the wash pass.

7. The vehicle wash system of claim 4 wherein the first tracer arm and the second tracer arm are rotatably coupled to the first carriage assembly and the second carriage assembly, respectively, in a manner to allow breakaway rotation about a substantially vertical axis should any portion of the first tracer arm, second tracer arm, first tracer arm nozzles or second tracer arm nozzles come into contact with any portion of the vehicle during the tracer pass or the wash pass.

8. The vehicle wash system of claim 7 wherein the rotatable coupling of the first tracer arm and the second tracer arm is further configured to allow breakaway movement in a horizontal direction.

9. A vehicle wash system, comprising:
a support structure positioned adjacent a wash zone, wherein the wash zone is sized to contain the vehicle;
a sprayer assembly movably coupled to the support structure, the sprayer assembly having a side tray supporting a plurality of side spray nozzles and a tracer wand supporting a plurality of tracer nozzles, with each of the side spray nozzles and each of the tracer spray nozzles configured to project a fluid toward the wash zone, wherein a movable coupling allows the sprayer assembly move in a first direction adjacent to and along a length of the wash zone, the sprayer assembly further configured to selectively cause the side tray to move in a second direction which will cause the plurality of side spay nozzles to move toward the wash zone, the sprayer assembly further configured to selectively cause the tracer wand to selectively move in a third direction which allow the tracer wand to be positioned adjacent to the vehicle and within the wash zone;
a controller operatively coupled to the sprayer assembly and configured to independently control movement of the spray assembly in the first direction, movement of the tray in the second direction and movement of the tracer and in the third direction;
a side sensor carried by the spray tray and configured to provide sensor signals to the controller, the side sensor configured to produce a signal indicative of the distance between the vehicle and the spray tray, thereby allowing the controller to move the spray tray into a position which causes the side spray nozzles to be a predetermined distance from the vehicle;
a wand sensor coupled to the spray wand and movable therewith, the wand sensor, the wand sensor configured to provide a signal indicative of the distance between the spray wand and the vehicle, thereby allowing the controller to move the spray wand into a position which causes the wand nozzles to be a predetermined distance from the vehicle; and
a fluid control system configured to provide a wash fluid to the side spray nozzles and the wand nozzles;
wherein the controller is coupled with the fluid controller in a manner to control the amount of wash fluid provided to the side spray nozzles and the wand nozzles.

10. The vehicle wash system of claim 9 wherein the sprayer assembly further comprises a plurality of trace sensors positioned adjacent the spray wand, wherein the trace sensors are capable of tracing the vehicle as the spray system moves through a trace pass, wherein the trace sensors allow the controller to trace an outline of the vehicle, wherein the outline of the vehicle is used during a subsequent wash pass to allow the wand nozzles and the side sprayer nozzles to be positioned in close proximity to the vehicle.

11. The vehicle wash system of claim 9, wherein the wash system is housed within a wash facility, and wherein the support structure is attached to a wall of the wash facility.

12. The vehicle wash system of claim 9 wherein the first direction, second direction and third direction are orthogonal.

13. The vehicle wash system of claim 9 wherein the fluid control system is configured to independently apply both a wash solution and a rinse solution.

14. The vehicle wash system of claim 13 wherein the controller is further configured to independently actuate any selected one of the plurality of side spray nozzles, and is further configured to independently actuate any selected one of the plurality of wand nozzles.

15. The vehicle wash system of claim 9 wherein the side sensors comprise a pair of radar sensor configured to detect portions of a vehicle in a first detection zone and a second detection zone, with the first detection zone and the second detection zone being adjacent to one another thereby allowing the control system to trace the vehicle.

16. The vehicle wash system of claim 9 wherein an area above the wash zone is free of equipment, thus creating an open-top wash system.

* * * * *